United States Patent
Mondal et al.

(10) Patent No.: US 12,165,299 B2
(45) Date of Patent: Dec. 10, 2024

(54) ENHANCING LIGHT TEXT IN SCANNED DOCUMENTS WHILE PRESERVING DOCUMENT FIDELITY

(71) Applicant: Adobe Inc., San Jose, CA (US)

(72) Inventors: Prasenjit Mondal, Panchgechia (IN); Sachin Soni, Palam Colony (IN)

(73) Assignee: Adobe Inc., San Jose, CA (US)

( * ) Notice: Subject to any disclaimer, the term of this patent is extended or adjusted under 35 U.S.C. 154(b) by 356 days.

(21) Appl. No.: 17/650,976

(22) Filed: Feb. 14, 2022

(65) Prior Publication Data

US 2023/0260091 A1   Aug. 17, 2023

(51) Int. Cl.
*G06T 5/40* (2006.01)
*G06T 5/60* (2024.01)
*G06T 5/80* (2024.01)
*G06T 5/92* (2024.01)
*G06V 10/82* (2022.01)

(52) U.S. Cl.
CPC .................. *G06T 5/80* (2024.01); *G06T 5/40* (2013.01); *G06T 5/60* (2024.01); *G06T 5/92* (2024.01); *G06V 10/82* (2022.01); *G06T 2207/10008* (2013.01); *G06T 2207/20024* (2013.01); *G06T 2207/20084* (2013.01); *G06T 2207/30176* (2013.01)

(58) Field of Classification Search
None
See application file for complete search history.

(56) References Cited

U.S. PATENT DOCUMENTS 10,559,067 B2 * 2/2020 Mondal .................. G06V 10/26
2021/0227096 A1 * 7/2021 Lin ............................ G06T 5/80

OTHER PUBLICATIONS

Bradley, Derek et al.; "Adaptive Thresholding Using the Integral Image"; Published online: Jan. 30, 2011; Journal of Graphic Tools; vol. 12, 2007; Issue 2; http://citeseerx.ist.psu.edu/viewdoc/download?doi=10.1.1.420.7883&rep=rep1&type=pdf.
J. Bernsen, "Dynamic Thresholding of Gray Level Image," ICPR 86: Proceedings of International Conference on Pattern Recognition, Berlin, 1986; Abstract.

(Continued)

*Primary Examiner* — Bernard Krasnic
(74) *Attorney, Agent, or Firm* — Keller Preece PLLC

(57) ABSTRACT

The present disclosure relates to systems, non-transitory computer-readable media, and methods that implement an image filter for enhancing light text and removing document shadows. In particular embodiments, the disclosed systems use a modified adaptive thresholding approach the relies on image gradients to efficiently guide the thresholding process. In addition, the disclosed systems use a machine-learning model to generate a document shadow map. The document shadow map can include text reflections. Accordingly, the disclosed systems remove text reflections from the document shadow map (e.g., by using an interpolated shadow intensity value of neighboring shadow map pixels). In turn, the disclosed systems use the document text mask and the document shadow map cleaned of text reflections to remove shadows from the digital image. Further, the disclosed systems enhance text in the shadow-removed digital image based on contrast stretching.

20 Claims, 18 Drawing Sheets

(56) References Cited

OTHER PUBLICATIONS

Hu, Xiaowei et al. "Mask-ShadowGAN: Learning to Remove Shadows From Unpaired Data." 2019 IEEE/CVF International Conference on Computer Vision (ICCV) (2019): 2472-2481.

Naveena, Chikkaguddaiah & Gopalakrishna, MT & Shilpa, M . . . (2020). An Approach for Shadow Detection and Removal using Machine Learning Techniques. IET Image Processing. 14. 10.1049/iet-ipr.2020.0001.

Y.-H. Lin, W.-C. Chen and Y.-Y. Chuang, "BEDSR-Net: A Deep Shadow Removal Network From a Single Document Image," 2020 IEEE/CVF Conference on Computer Vision and Pattern Recognition (CVPR), 2020, pp. 12902-12911, doi: 10.1109/CVPR42600.2020.01292.

Bako, Steve et al.; "Removing Shadows from Images of Documents"; Asian Conference on Computer Vision (ACCV 2016), 2016.

V. Shah and V. Gandhi, "An Iterative Approach for Shadow Removal in Document Images," 2018 IEEE International Conference on Acoustics, Speech and Signal Processing (ICASSP), 2018, pp. 1892-1896, doi: 10.1109/ICASSP.2018.8462476.

Le, Hieu and Samaras, Dimitris; "From Shadow Segmentation to Shadow Removal"; The IEEE European Conference on Computer Vision (ECCV); Aug. 2020.

Eyupoglu, Can; Implementation of Bernsen's Locally Adaptive Binarization Method for Gray Scale Images, The Online Journal of Science and Technology—Apr. 2017 vol. 7, Issue 2, pp. 68-72.

\* cited by examiner

*Fig. 9A*

ENHANCING LIGHT TEXT IN SCANNED DOCUMENTS WHILE PRESERVING DOCUMENT FIDELITY

BACKGROUND

Recent years have seen significant advancement in hardware and software platforms for generating and editing digital images. In particular, with the advancement of high-resolution cameras in mobile devices, image capture for both document and natural images have accelerated at a rapid pace. Indeed, conventional image systems have leveraged mobile device capabilities to convert a mobile device into a powerful portable scanner. Unfortunately, a number of problems plague these conventional image systems. For example, conventional image systems generate digital scans with poor image quality due to image shadows and/or whitewashed content (e.g., text). Additionally, some conventional image systems suffer from limited system flexibility.

To illustrate, conventional image systems commonly generate digital scans with shadows from low to high intensity based on the lighting conditions at the time of capture. These shadows are visually distracting. In addition, shadows often impair machine and user readability of a digital scan. For example, shadows often hinder optical character recognition or other image processing. Shadows also exacerbate other issues (e.g., light or faded text in a text document).

To remedy shadow issues, some conventional image systems implement shadow removal filters for digital scans. Unfortunately, conventional image systems that implement shadow removal introduce another aspect of poor image quality, namely whitewashed content. In particular, conventional image systems that remove shadows from digital scans often worsen the readability of already light or faded text. This creates a whitewashed effect with lost, truncated, or indecipherable text. Accordingly, conventional image systems are often incapable of removing shadows (particularly dark, hard shadows) from digital scans while preserving document fidelity.

In addition to poor image quality, conventional image systems also suffer from reduced system flexibility. In particular, some conventional image systems utilize deep learning approaches to generate shadow masks (e.g., for removing shadows from digital scans based on the shadow masks). However, these deep learning approaches are often limited to capturing small variations in scene contents. That is, some deep learning approaches are able to remove shadows for specific types of digital scans, such as form documents, research articles, or natural images—but not in an accurate or consistent manner for other types of scans. Further, different types of shadows, illumination conditions, and document features (e.g., folds, creases) create challenging variables that most conventional image systems are incapable of processing with variations in digital scans.

BRIEF SUMMARY

Embodiments of the present disclosure provide benefits and/or solve one or more of the foregoing or other problems in the art with systems, non-transitory computer-readable media, and methods for enhancing document text while removing shadows within a digital image in a manner that preserves document fidelity. Specifically, the disclosed systems implement novel image processing algorithms to identify and isolate text from a background of a scanned document. The disclosed system further utilize deep learning and other image processing algorithms to identify and remove shadows from the scanned document in a manner that prevents or reduces artifacts from text reflections. Furthermore, the disclosed systems enhance light text in a scanned document with the shadows removed utilizing novel image processing algorithms.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIGS. 9A-9B illustrate experimental results of the scanned text enhancement system in accordance with one or more embodiments.

DETAILED DESCRIPTION

Figure 1:
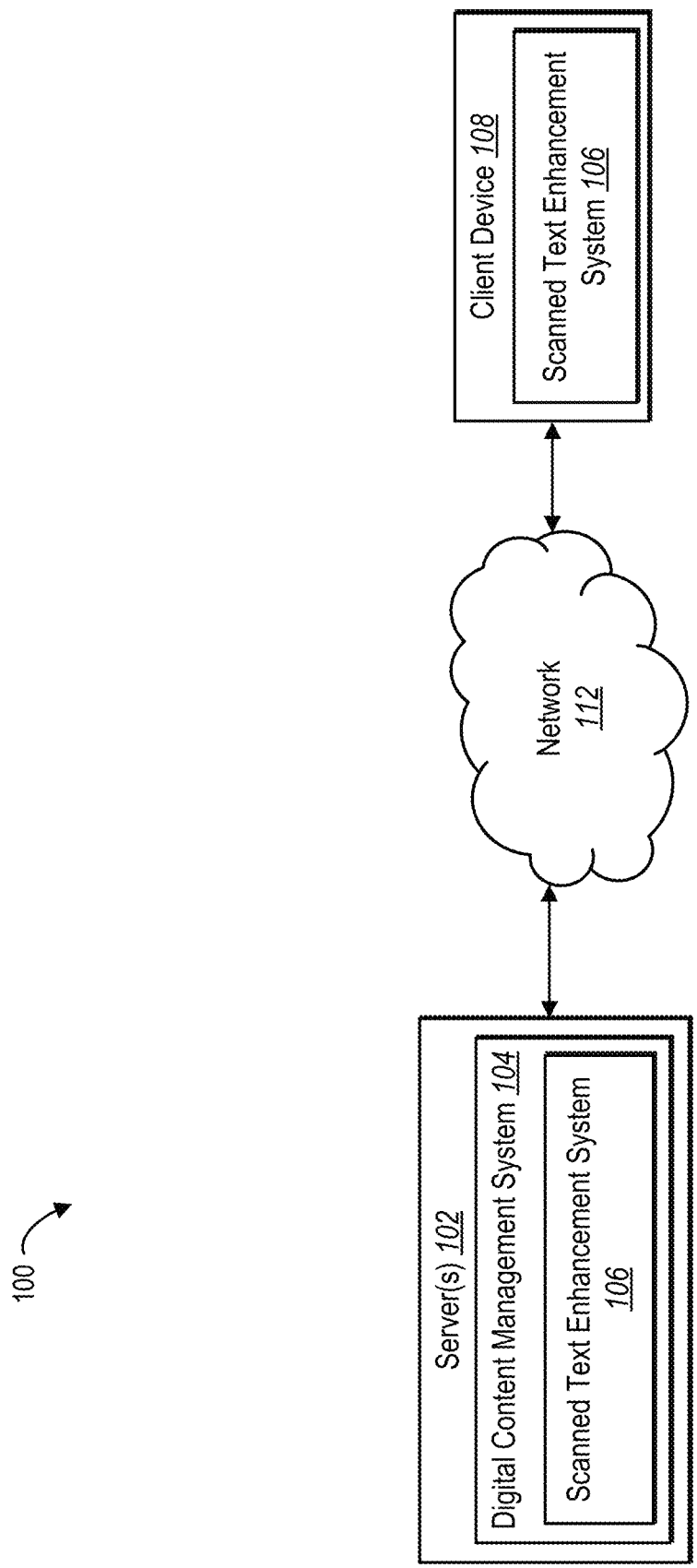
FIG. 1 illustrates a computing system environment for implementing a scanned text enhancement system in accordance with one or more embodiments.

One or more embodiments described herein include a scanned text enhancement system that enhances light text in scanned documents while preserving document fidelity. For example, in one or more implementations, the scanned text enhancement system identifies and isolates text from a background of a scanned document utilizing an adaptive thresholding approach guided by image gradients to generate a document foreground mask. In addition, the scanned text enhancement system utilizes a machine-learning model to generate a shadow map based on the document foreground mask. Further, the scanned text enhancement system remove shadows and artifacts from reflected text from the scanned document based on the shadow map to generate a shadow-removed image. Additionally, in one or more implementations, the scanned text enhancement system utilizes contrast stretching to enhance light text within the shadow-removed image.

More specifically, the scanned text enhancement system generates a document text mask for a digital image based on adaptive filtering. Additionally, the scanned text enhancement system intelligently generates a document shadow map of the digital image utilizing a machine-learning model. The scanned text enhancement system modifies the document shadow map by removing text reflections from pixels associated with text in the document text mask. Cleaned of text reflections, the scanned text enhancement system removes shadows from the digital image according to the modified document shadow map. In certain embodiments, the scanned text enhancement system darkens (or lightens) document content by modifying intensity values for pixels of the shadow-removed digital image utilizing contrast stretching.

As just mentioned, in one or more embodiments, the scanned text enhancement system generates document text masks utilizing a novel algorithm based on adaptive filtering to identify which pixels within a histogram stretched gradient image (also generated from the digital image) are foreground pixels or background pixels. Specifically, for a dark pixel in the histogram stretched gradient image, the scanned text enhancement system identifies a corresponding pixel in an integral image. The scanned text enhancement system identifies characteristics (e.g., average pixel color value) for a group of neighboring pixels around the corresponding pixel in integral image. In turn, the scanned text enhancement system compares the dark pixel in the histogram stretched gradient image with the identified characteristics of the group of neighboring pixels in the integral image. From the comparison, the scanned text enhancement system generates a document text mask by identifying the dark pixel in the histogram stretched gradient image as either foreground or background. In this way, the scanned text enhancement system is able to preserve hard contrast lines and ignore soft gradient changes—thereby lending to increased accuracy of the document text mask.

In addition, the scanned text enhancement system generates a document shadow map utilizing a machine-learning model. In one or more embodiments, the scanned text enhancement system trains the machine-learning model using a synthetic data set with myriad different digital images, including digital images with different blends and configurations of shadows. Moreover, in one or more embodiments, the scanned text enhancement system trains the machine-learning model to accurately learn parameters for generating document shadow maps of digital images based on novel loss functions. Specifically, these novel loss functions generate (i) a distance loss for a false positive pixel misclassified as a foreground pixel in a training document shadow map and (ii) a group loss for a false negative pixel misclassified as a background pixel in the training document shadow map.

Often, document shadow maps include text reflections that appear as visual artifacts or residual text. These text reflections within a document shadow map are problematic for removing shadows because text reflections often cause a loss of textual information from the digital image (e.g., as similarly described above in relation to the whitewash effect for conventional image systems). To avoid such issues, the scanned text enhancement system generates a modified document shadow map by removing text reflections from the document shadow map. More specifically, in one or more embodiments, the scanned text enhancement system replaces pixels having text reflections with interpolated color values. For example, guided by the document text mask, the scanned text enhancement system determines an average shadow intensity value for a group of neighboring pixels in the document shadow map to use as the replacement shadow intensity value for a pixel in the document shadow map with text reflections.

Utilizing the modified document shadow map, the scanned text enhancement system is able to remove shadows accurately and efficiently from a digital image. In particular embodiments, the scanned text enhancement system performs one or more operations that better preserves the color of the digital image. To illustrate, the scanned text enhancement system determines a reflectance of the digital image and binarizes the modified document shadow map. In addition, the scanned text enhancement system determines a global background color based on the digital image, the document text mask, and the binarized shadow map. In turn, the scanned text enhancement system generates the shadow-removed digital image based on the reflectance of the digital image and the global background color of the digital image.

In one or more embodiments, the scanned text enhancement system enhances text (e.g., light text) of the shadow-removed digital image to generate an enhanced digital image. In particular embodiments, the scanned text enhancement system utilizes contrast stretching (e.g., linear or non-linear contrast stretching) to stretch a range of intensity values to a desired range of intensity values. For example, in non-linear contrast stretching implementations, the scanned text enhancement system uses a predetermined intensity value point to define two or more segments of stretched intensity values. In certain implementations, the scanned text enhancement system uses the document text mask to guide which pixels of the shadow-removed digital image to enhance (e.g., darken or lighten) based on the stretched intensity values.

As briefly mentioned above, a number of problems exist with conventional image systems. The scanned text enhancement system addresses many of these technical drawbacks. For example, the scanned text enhancement system improves image quality for digital images of scanned documents. In particular, the scanned text enhancement system removes a variety of different shadows, blends of shadows, configurations of shadows, intensities of shadows, etc. In addition to removing shadows, the scanned text enhancement system preserves document fidelity by enhancing text of a digital image. Specifically, unlike conventional image systems, the scanned text enhancement system removes shadows in such a way that preserves document content (including light or faded text). For example, the scanned text enhancement system uses adaptive filtering guided by image gradients to efficiently create a more accurate document text mask. The scanned text enhancement system uses the document text mask to remove text reflections in a document shadow map. In this way, the scanned text enhancement system preserves text during the shadow removal process without imparting a whitewashed effect (unlike conventional image systems). As a result, the scanned text enhancement system generates enhanced digital images that are more machine-readable and user friendly.

In addition to improved image quality over conventional image systems, the scanned text enhancement system also provides increased system flexibility. For example, unlike some conventional image systems using deep learning approaches for generating shadow maps, the scanned text enhancement system trains a machine-learning model to generate shadow maps for a variety of different types of documents (e.g., forms, books, magazines, journals, newspapers, receipts, files, notepads, bound documents, etc.). Moreover, by using novel losses (e.g., a distance loss and a group loss), the scanned text enhancement system more accurately trains a machine-learning model to generate shadow maps for such a wide variety of different types of documents. In addition, the scanned text enhancement system trains the machine-learning model using a synthetic training dataset for increased model robustness and processing flexibility.

It will also be appreciated that, in one or more embodiments, the scanned text enhancement system also improves processing performance for implementing computing devices (e.g., increased processing speed or reduced computational overhead). For example, the scanned text enhancement system utilizes an optimized approach based on image gradients unlike the computationally expensive approach of some conventional image systems that implement adaptive thresholding on a pixel-by-pixel basis. To illustrate, in certain implementations, the scanned text enhancement system performs adaptive thresholding for pixels of a gradient image which satisfy a threshold pixel color value. Under this approach, the scanned text enhancement system avoids noise artifacts that negatively impact quality and performance (especially in higher resolution images). Accordingly, utilizing image gradients for adaptive filtering provides a performance-boosting approach that imparts system compatibility to a wide variety of client devices—including mobile devices with limited performance capabilities.

Additional detail will now be provided in relation to illustrative figures portraying example embodiments and implementations of a scanned text enhancement system. For example, FIG. 1 illustrates a computing system environment (or "environment") 100 for implementing a scanned text enhancement system 106 in accordance with one or more embodiments. As shown in FIG. 1, the environment 100 includes server(s) 102, a client device 108, and a network 112. Each of the components of the environment 100 communicate (or are at least configured to communicate) via the network 112. Example networks are discussed in more detail below in relation to FIG. 12.

As further illustrated in FIG. 1, the environment 100 includes the server(s) 102. In some embodiments, the server(s) 102 comprises a content server and/or a data collection server. Additionally, or alternatively, the server(s) 102 comprise an application server, a communication server, a web-hosting server, a social networking server, or a digital content management server.

Moreover, as shown in FIG. 1, the server(s) 102 implement a digital content management system 104. In one or more embodiments, the digital content management system 104 generates, receives, edits, manages, and/or stores digital images. For example, in some instances, the digital content management system 104 accesses a digital image and transmits the digital image to at least one of the scanned text enhancement system 106 or the client device 108. In other instances, the digital content management system 104 receives generated digital images (e.g., enhanced digital images) for transmitting in one or more formats via the network 112, storing in cloud storage hosted on the server(s) 102, etc.

The scanned text enhancement system 106 can efficiently and accurately generate an enhanced digital image of a scanned document. To do so, in one or more embodiments, the scanned text enhancement system 106 leverages adaptive filtering for generating a document text mask. In particular, the scanned text enhancement system 106 uses the document text mask and a modified document shadow map to generate an enhanced digital image of a scanned document (as will be explained below in relation to subsequent figures).

As shown in FIG. 1, the environment 100 includes the client device 108. The client device 108 can include one of a variety of computing devices, including a smartphone, tablet, smart television, desktop computer, laptop computer, virtual reality device, augmented reality device, or other computing device as described in relation to FIG. 12. Although FIG. 1 illustrates a single client device 108, in some embodiments the environment 100 includes multiple client devices 108 (e.g., multiple mobile computing devices connected to each other via the network 112). Further, in some embodiments, the client device 108 receives user input (e.g., natural language commands) and provides information pertaining to accessing, viewing, modifying, generating, enhancing, and/or interacting with a digital image to the server(s) 102.

Moreover, as shown, the client device 108 optionally includes a version of the scanned text enhancement system 106. In particular embodiments, the scanned text enhancement system 106 on the client device 108 comprises a web application, a native application installed on the client device 108 (e.g., a mobile application, a desktop application, a plug-in application, etc.), or a cloud-based application where part of the functionality is performed by the server(s) 102. In some embodiments, the scanned text enhancement system 106 on the client device 108 presents or displays information to a user associated with the client device 108, including enhanced digital images as provided in this disclosure. Furthermore, in one or more embodiments, the scanned text enhancement system 106 on the client device 108 captures physical documents via a camera. In other words, the scanned text enhancement system 106 on the client device 108 generates digital images of physical documents (i.e., scans documents) with a camera. In other implementations, the scanned text enhancement system 106 on the client device 108 accesses or receives digital images of scanned documents.

In additional or alternative embodiments, the scanned text enhancement system 106 on the client device 108 represents and/or provides the same or similar functionality as described herein in connection with the scanned text enhancement system 106 on the server(s) 102. In some implementations, the scanned text enhancement system 106 on the server(s) 102 supports the scanned text enhancement system 106 on the client device 108.

For example, in some embodiments, the server(s) 102 train one or more machine-learning models described herein. The scanned text enhancement system 106 on the server(s) 102 provides the one or more trained machine-learning models to the scanned text enhancement system 106 on the client device 108 for implementation. In other words, the client device 108 obtains (e.g., downloads) the scanned text enhancement system 106 from the server(s) 102. At this point, the client device 108 may utilize the scanned text enhancement system 106 to enhance scanned documents by performing the operations described herein independently from the server(s) 102.

In alternative embodiments, the scanned text enhancement system 106 includes a web hosting application that allows the client device 108 to interact with content and services hosted on the server (s) 102. To illustrate, in one or more implementations, the client device 108 accesses a web page or computing application supported by the server (s) 102. The client device 108 provides input to the server(s) 102 (e.g., captures a digital image of a physical document and sends the digital image to the server(s)) to generate an enhanced digital image, and, in response, the scanned text enhancement system 106 on the server (s) 102 performs operations described there in to enhance the digital image of the physical document. The server(s) 102 then provides the output or results of the operations (i.e., the enhanced digital image) to the client device 108.

In some embodiments, though not illustrated in FIG. 1, the environment 100 has a different arrangement of components and/or has a different number or set of components altogether. For example, in certain embodiments, the client device 108 communicates directly with the server(s) 102, bypassing the network 112. As another example, the environment 100 includes a third-party server comprising a content server and/or a data collection server.

Figure 2A:
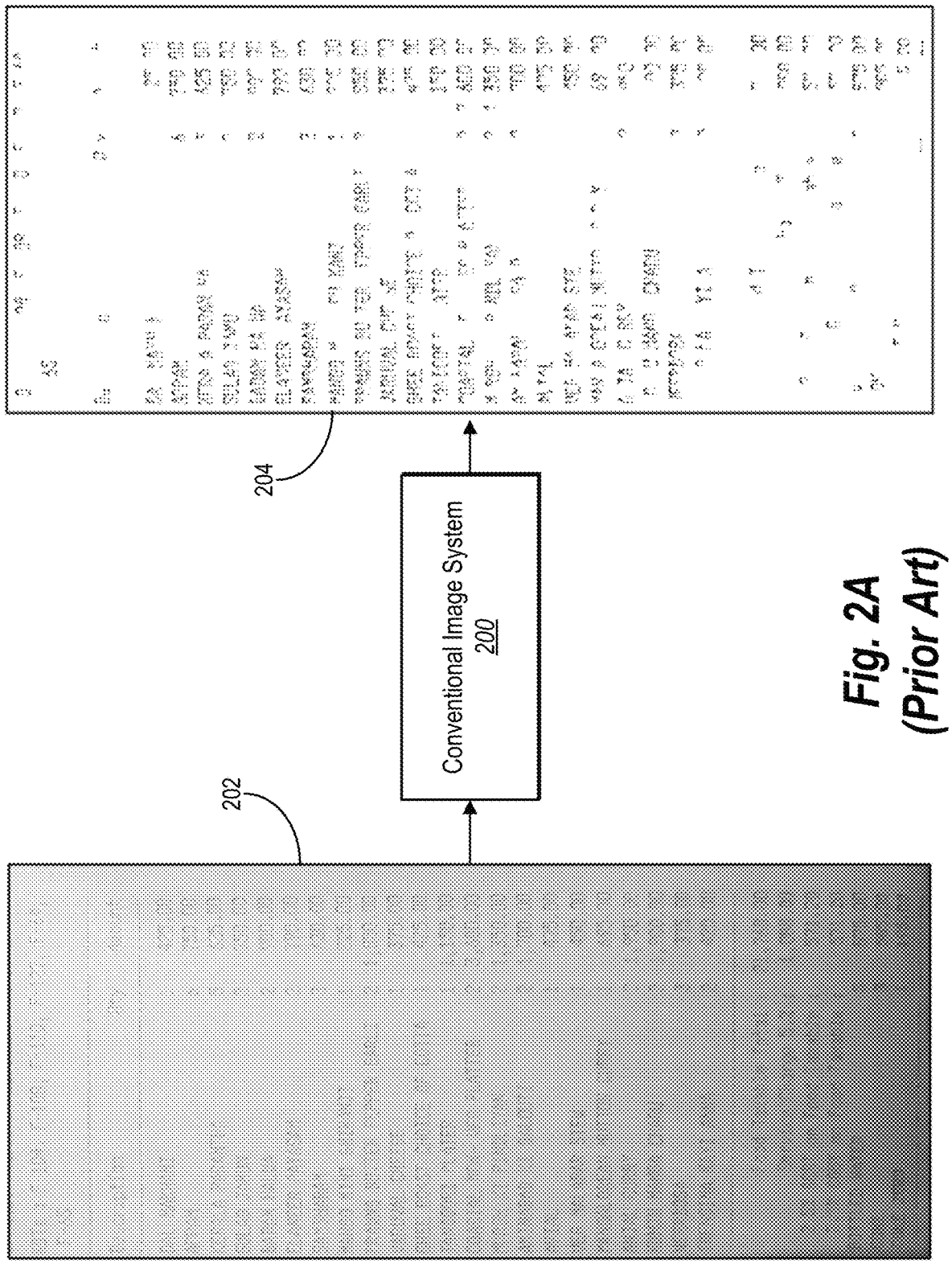
FIG. 2A shows a conventional image system generating an output image.

As mentioned above, conventional image systems suffer from poor image quality. For example, as shown in FIG. 2A, a conventional image system 200 processes an input image 202 portraying a scanned document with shadows and light text. Based on the processing, the conventional image system 200 generates an output image 204. As shown in the output image 204, the conventional image system 200 removes the shadows from the input image 202. However, in doing so, the conventional image system 200 sacrifices document fidelity. That is, the conventional image system 200 washes out text in the output image 204 such that portions of the text are omitted or rendered unreadable.

Figure 2B:
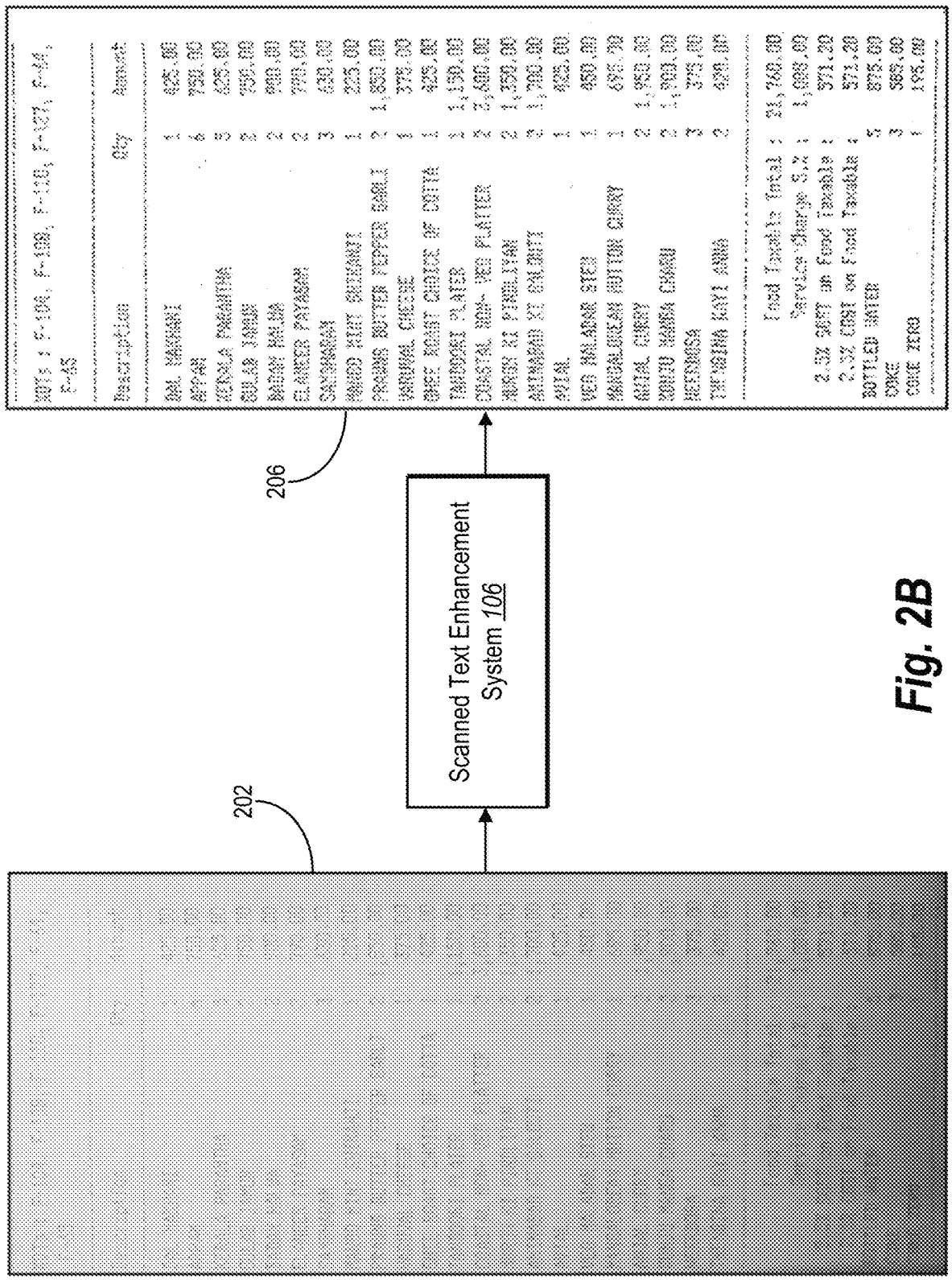
FIG. 2B shows a scanned text enhancement system generating a digital image with enhanced text by removing shadows in accordance with one or more embodiments.

By contrast, FIG. 2B shows the scanned text enhancement system 106 generating an enhanced digital image 206 in accordance with one or more embodiments. Specifically, the scanned text enhancement system 106 uses the same input image 202 to generate the enhanced digital image 206. As evident, the scanned text enhancement system 106 generates the enhanced digital image 206 without the shadows apparent in the input image 202. Additionally, however, the enhanced digital image 206 comprises darkened text that is clear and easily readable. Accordingly, the scanned text enhancement system 106 significantly improves image quality and scanned text over conventional systems.

As briefly discussed above, the scanned text enhancement system 106 efficiently and accurately generates enhanced digital images utilizing a novel combination of deep learning and image processing techniques. In accordance with one more such embodiments, FIG. 3 illustrates the scanned text enhancement system 106 from a scanned document.

Figure 3:
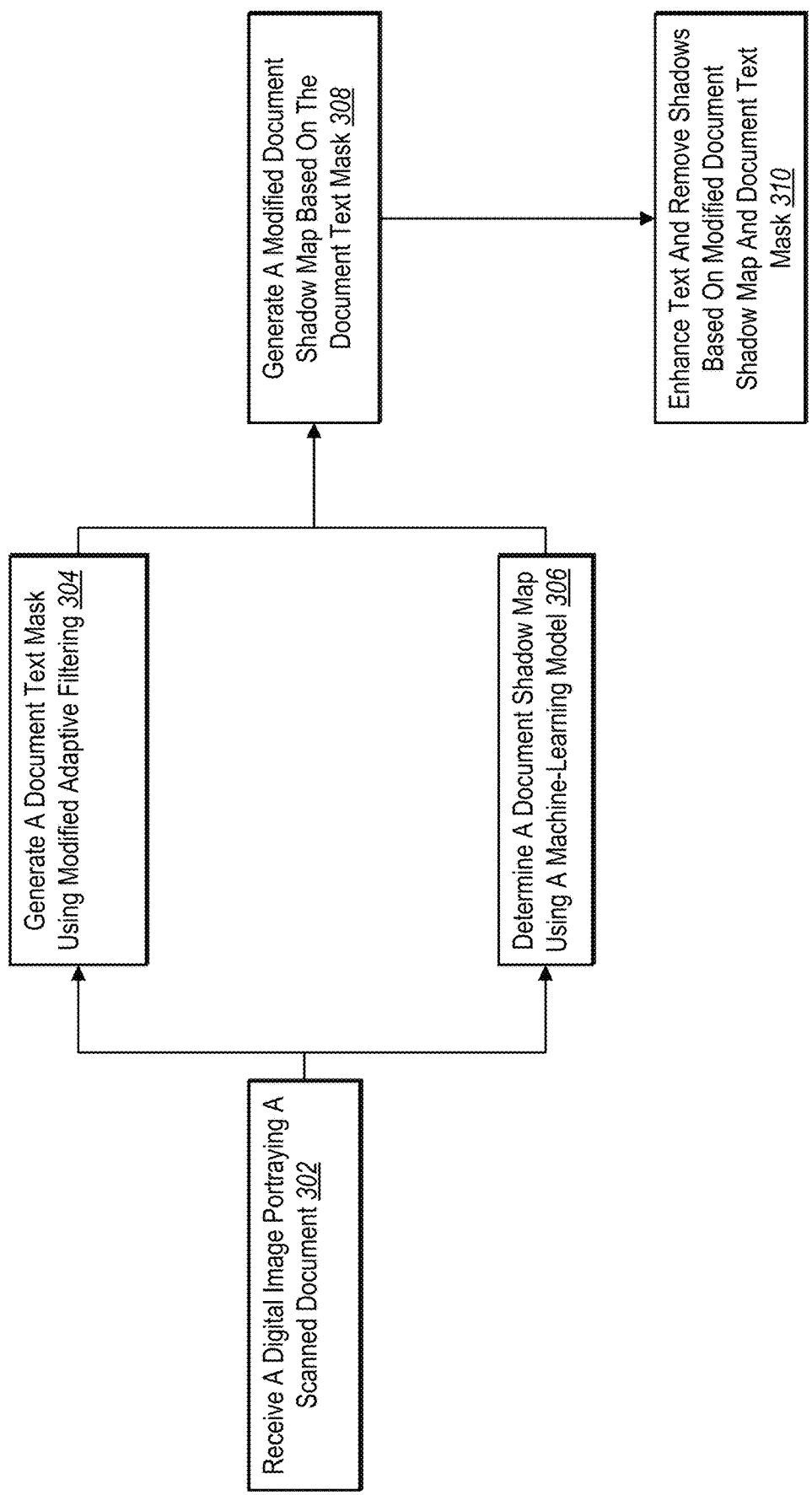
FIG. 3 illustrates the scanned text enhancement system generating an enhanced digital image based on a document text mask and a modified shadow map in accordance with one or more embodiments.

As shown at act 302 in FIG. 3, the scanned text enhancement system 106 receives a digital image portraying a scanned document. Thus, a digital image includes a digital file in a variety of digital formats or file types (e.g., .docx, .xslx, .pdf, .jpg, .png, etc.). In one or more embodiments, a digital image includes a digital document, a digital file, or a digital content item (e.g., that is capable of being printed or digitally transmitted via a network). In particular embodiments, a digital image portrays a scanned document (e.g., a tangible, physical document such as a form, business card, receipt, book, magazine, journal, file, atlas, notepad, etc.). Such scanned documents include one or more different types of content—including pictures, text, tables, graphs, symbols, QR codes, logos, handwriting, and the like. A digital image, in one or more implementations, portrays a non-document item, such as a whiteboard, projection screen, billboard sign, etc. Further, a digital image, in one or more implementation, includes a scanned document. A scanned document comprises an image capture of an object comprising text (paper, whiteboard, screen, sign, etc.). A scanned document comprises a digital image captured or generated by a scanner or other device with a camera (e.g., a mobile phone).

The scanned text enhancement system 106 receives the digital image. For example, in certain embodiments, the scanned text enhancement system 106 receives the digital image using a scanning element. In particular embodiments, a scanning element includes the features of a client device configured to capture and generate digital representations of objects (e.g., physical documents). Examples of scanning element include a camera, a scan reader, light-sensing hardware, or other capturing hardware of a client device (e.g., a mobile device, portable scanner). Thus, receiving the digital image portraying the scanned document comprises capturing a digital image or scan of the document utilizing a camera or other capturing device.

As another example, the scanned text enhancement system 106 receives the digital image via image uploads from a client device. For example, the client device stores the digital image in one or more memory devices on the client device (or alternatively in cloud storage accessible via the client device). Subsequently, the scanned text enhancement system 106 receives the digital image via network transmission from the client device. Additionally, or alternatively, the receiving the digital image includes identifying one or more user-selected images in an image gallery (e.g., as shown and described in relation to FIG. 8B).

At act 304, the scanned text enhancement system 106 generates a document text mask utilizing adaptive filtering. A document text mask includes a digital image with binary-colored pixels. For example, a document text mask includes a digital image with black pixels representing foreground portions (e.g., text) and white pixels representing background portions.

In particular embodiments, the scanned text enhancement system 106 generates the document text mask based on a combination of integral and gradient images derived from the digital image. In certain implementations, the scanned text enhancement system 106 uses a histogram-stretched gradient image to efficiently identify characteristics of a window (e.g., group) of pixels in the integral image. The scanned text enhancement system 106 uses the group-based characteristics to determine whether a pixel in the histogram-stretched gradient image is a foreground or background pixel. The act 304 is described in greater detail below in relation to FIG. 4.

At act 306, the scanned text enhancement system 106 determines a document shadow map utilizing a machine-learning model. A document shadow map includes a light-based or color-based representation of a digital image. In particular embodiments, a shadow map includes a digital-image representation with pixels having predicted shadow intensity values that correspond to (or result from) one or more lighting conditions. Accordingly, a shadow map represents shadows, glare, color, or other visual features captured in a digital image as a result of lighting conditions at the time of image capture or scan. The act 306 is described in further detail below in relation to FIG. 5.

At act 308, the scanned text enhancement system 106 generates a modified document shadow map based on the document text mask. Often, the document shadow map generated at the act 306 comprises text reflections (e.g., visual artifacts or residual text) from the digital image. Accordingly, the act 308 comprises removing the text reflections from the document shadow map. For example, the act 308 includes replacing the pixels of the document shadow map having text reflections with interpolated color values. This process is described in more detail below in relation to FIG. 5.

At act 310, the scanned text enhancement system 106 generates an enhanced digital image. An enhanced digital image comprises a modified version of the digital image received at the act 302. For instance, an enhanced digital image includes a digital image with increased readability or visual clarity. To illustrate, an enhanced digital image includes a digital image without shadows, lightened text replaced with darkened text, etc.

In particular embodiments, the act 310 comprises enhancing text and removing shadows based on the modified document shadow map and the document text mask. To do so, in one or more embodiments, the scanned text enhancement system 106 generates a shadow-removed digital image based on a reflectance of the digital image and a global background color of the digital image. Subsequently, the scanned text enhancement system 106 darkens (and/or optionally lightens) text in the shadow-removed digital image. The particular details of the act 310 are described in further detail below in relation to FIGS. 6A-6B.

Figure 4:
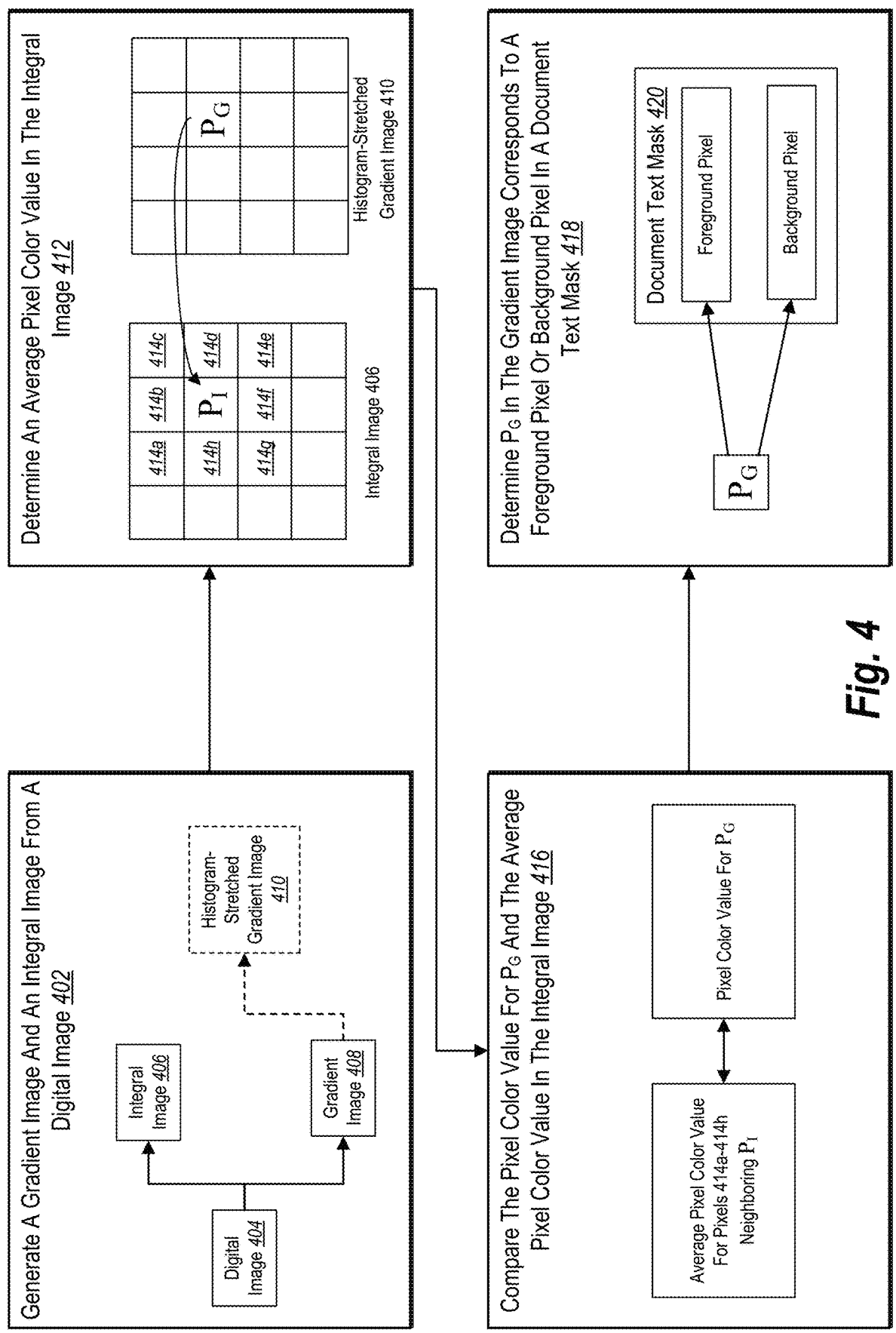
FIG. 4 illustrates the scanned text enhancement system generating a document text mask in accordance with one or more embodiments.

FIG. 4 illustrates additional details of the scanned text enhancement system 106 generating a document text mask utilizing adaptive filtering as mentioned above in relation to act 304 of FIG. 3. In certain embodiments, the scanned text enhancement system 106 smooths a digital image 404 portraying a scanned document. To illustrate, the scanned text enhancement system 106 smooths the digital image 404 using a Gaussian filter (e.g., to reduce speckle noise introduced in the digital image 404 during image capture).

As shown at act 402 in FIG. 4, the scanned text enhancement system 106 generates a gradient image and an integral image from a digital image 404 portraying a scanned document. For example, the scanned text enhancement system 106 generates an integral image 406 from a digital image 404. To illustrate, the scanned text enhancement system 106 uses a mapping function that maps from pixels in the digital image 404 to real numbers in the integral image 406 (also known as a summed-area table). In particular embodiments, the scanned text enhancement system 106 uses the mapping function to determine a real number (e.g., an integral value) for the integral image 406 that represents the sum of pixel color values for a rectangular region of the digital image 404. Specifically, in certain implementations, the scanned text enhancement system 106 uses function (1) to determine an integral value at any point (x,y) of a digital image I, $$I(x,y)=i(x,y)+I(x-1,y)+I(x,y-1)+I(x-1,y-1) \quad (1)$$

where i(x,y) is the intensity at point (x,y).

Additionally shown at the act 402, the scanned text enhancement system 106 generates a gradient image 408 from the digital image 404. In particular embodiments, the scanned text enhancement system 106 generates the 408 by determining a directional change in the intensity or color of the digital image 404. Accordingly, each pixel of the gradient image 408 measures the change in intensity of that same point in the digital image 404 in a given direction. In certain implementations, the scanned text enhancement system 106 generates these gradient values by convolving the digital image 404 utilizing one or more filters (e.g., a Sobel filter).

Further shown at the act 402, the scanned text enhancement system 106 optionally generates a histogram-stretched gradient image 410 from the gradient image 408. By generating (and utilizing the histogram-stretched gradient image 410 as discussed below), the scanned text enhancement system 106 reduces errors and improve a quality of an enhanced digital image. Specifically, a great deal of noise and artifacts are often present in the digital image 404 due to various types of shadows and/or other lighting conditions embedded at time of capture via a client device. This degradation often leads to pixel misclassification for a document text mask. Accordingly, in one or more embodiments, the scanned text enhancement system 106 generates and uses the histogram-stretched gradient image 410 to reduce or avoid noise, artifacts, or other imperfections.

In one or more embodiments, the histogram-stretched gradient image 410 comprises an enhanced contrast of the gradient image 408. In particular embodiments, the scanned text enhancement system 106 modifies the brightness (e.g., intensity values) of pixels in the gradient image 408 according to one or more functions. For example, the scanned text enhancement system 106 modifies the pixel values of the gradient image 408 utilizing histogram stretching or other mapping function that specifies an output pixel brightness value for each input pixel brightness value.

As mentioned above, the scanned text enhancement system 106 performs adaptive filtering to generate a document text mask utilizing and adaptive thresholding process. More specifically, the scanned text enhancement system 106 performs by adaptive thresholding by considering each dark pixel "p" in the histogram stretched image, defining a window in the integral image, comparing the pixel "p" with the surrounding pixels in the window, determining the average of the pixels in the window but excluding the pixel "p", and if the value of the pixel "p" is less than the average, "p" defining "p" as a document mask pixel. Otherwise, the scanned text enhancement system 106 defines "p" as a background pixel. The adaptive filtering process performed by the scanned text enhancement system 106 is described in greater detail in relation to acts 412, 416, and 418.

In particular, at act 412, the scanned text enhancement system 106 implements a modified adaptive filtering method. This modified adaptive filtering method, unlike those of conventional image systems, utilizes the gradient image 408 (or more particularly, the histogram-stretched gradient image 410) to optimize the adaptive thresholding process. Typically, conventional image systems perform adaptive thresholding on a pixel-by-pixel basis (which is time-expensive and computationally expensive). By contrast, the scanned text enhancement system 106 uses the histogram-stretched gradient image 410 to selectively perform adaptive thresholding for pixels that are suitable candidates for a document text mask. This single pass optimization leads to increased performance in terms of processing speed and memory requirements (as described above).

In more detail, the act 412 comprises the scanned text enhancement system 106 determining an average pixel color value in the integral image 406. In particular embodiments, the scanned text enhancement system 106 identifies pixels in the histogram-stretched gradient image 410 that satisfy a threshold pixel color value (or range of pixel color values). For example, the scanned text enhancement system 106 identifies darker pixels in the histogram-stretched gradient image 410 with pixel color values that are less than (or equal to) a threshold pixel color value. A pixel satisfying the threshold pixel color value in the histogram-stretched gradient image 410 is denoted as $P_G$ at the act 412 of FIG. 4.

Upon identifying the pixel $P_G$ in the histogram-stretched gradient image 410, the scanned text enhancement system 106 identifies a pixel $P_I$ in the integral image 406 that corresponds to (i.e., maps to) the pixel $P_G$ in the histogram-stretched gradient image 410. In turn, the scanned text enhancement system 106 identifies a group of pixels 414a-414h that neighbor or surround the pixel $P_I$ in the integral image 406. In one or more embodiments, the scanned text enhancement system 106 identifies the group of pixels 414a-414h using a pixel window of a configurable size (e.g., w×w) centered at the pixel $P_I$ in the integral image 406.

The scanned text enhancement system 106 determines the average pixel color value of the group of pixels 414a-414h. For example, the scanned text enhancement system 106 sums each individual pixel color value for the group of pixels 414a-414h and divides by the total number of pixels in the group of pixels 414a-414h. It will be appreciated that determining the average pixel color value of the group of pixels 414a-414h excludes accounting for the pixel color value of the pixel $P_I$ in the center of the pixel window.

At act 416, the scanned text enhancement system 106 compares the pixel color value for the pixel $P_G$ in the histogram-stretched gradient image 410 and the average pixel color value for the group of pixels 414a-414h in the integral image 406. For example, the scanned text enhancement system 106 determines whether the pixel color value for the pixel $P_G$ in the histogram-stretched gradient image 410 is less than (or equal to) the average pixel color value for the group of pixels 414a-414h in the integral image 406.

Based on the comparison, the scanned text enhancement system 106 performs act 418. In particular, the act 418 comprises determining whether the pixel $P_G$ in the histogram-stretched gradient image 410 corresponds to either a foreground pixel or a background pixel in a document text mask 420. For example, the scanned text enhancement system 106 determines the pixel $P_G$ in the histogram-stretched gradient image 410 is a foreground pixel in the document text mask 420 based on the comparison at the act 416 indicating the pixel color value for the pixel $P_G$ is less than (or equal to) the average pixel color value for the group of pixels 414a-414h in the integral image 406. In contrast, the scanned text enhancement system 106 determines the pixel $P_G$ in the histogram-stretched gradient image 410 is a background pixel in the document text mask 420 based on the comparison at the act 416 indicating the pixel color value for the pixel $P_G$ is greater than (or equal to) the average pixel color value for the group of pixels 414a-414h in the integral image 406.

The scanned text enhancement system 106 subsequently (or in parallel) performs the foregoing acts for other dark pixels in the histogram-stretched gradient image 410. For example, the scanned text enhancement system 106 performs the foregoing acts for each dark pixel in the histogram-stretched gradient image 410 until the scanned text enhancement system 106 completes generation of the document text mask 420.

It will be appreciated that, in one or more alternative embodiments, the scanned text enhancement system 106 utilizes one or more modified approaches to the foregoing acts. For example, in one or more embodiments, the scanned text enhancement system 106 uses the gradient image 408 instead of the histogram-stretched gradient image 410 to perform the acts 412, 416, or 418. As another example, the scanned text enhancement system 106 uses different shapes of pixel windows for identifying the group of pixels neighboring the pixel $P_I$ in the integral image 406.

As mentioned above, the scanned text enhancement system 106 generates a document shadow map. The document shadow map often includes imperfections (e.g., wrong shadow intensity prediction values) appearing as text reflections that lead to content whitewash and poor textual quality if not removed. The scanned text enhancement system 106, therefore, performs modifications to the document shadow map. In accordance with one or more embodiments, FIG. 5 illustrates the scanned text enhancement system 106 generating a modified document shadow map.

Figure 5:
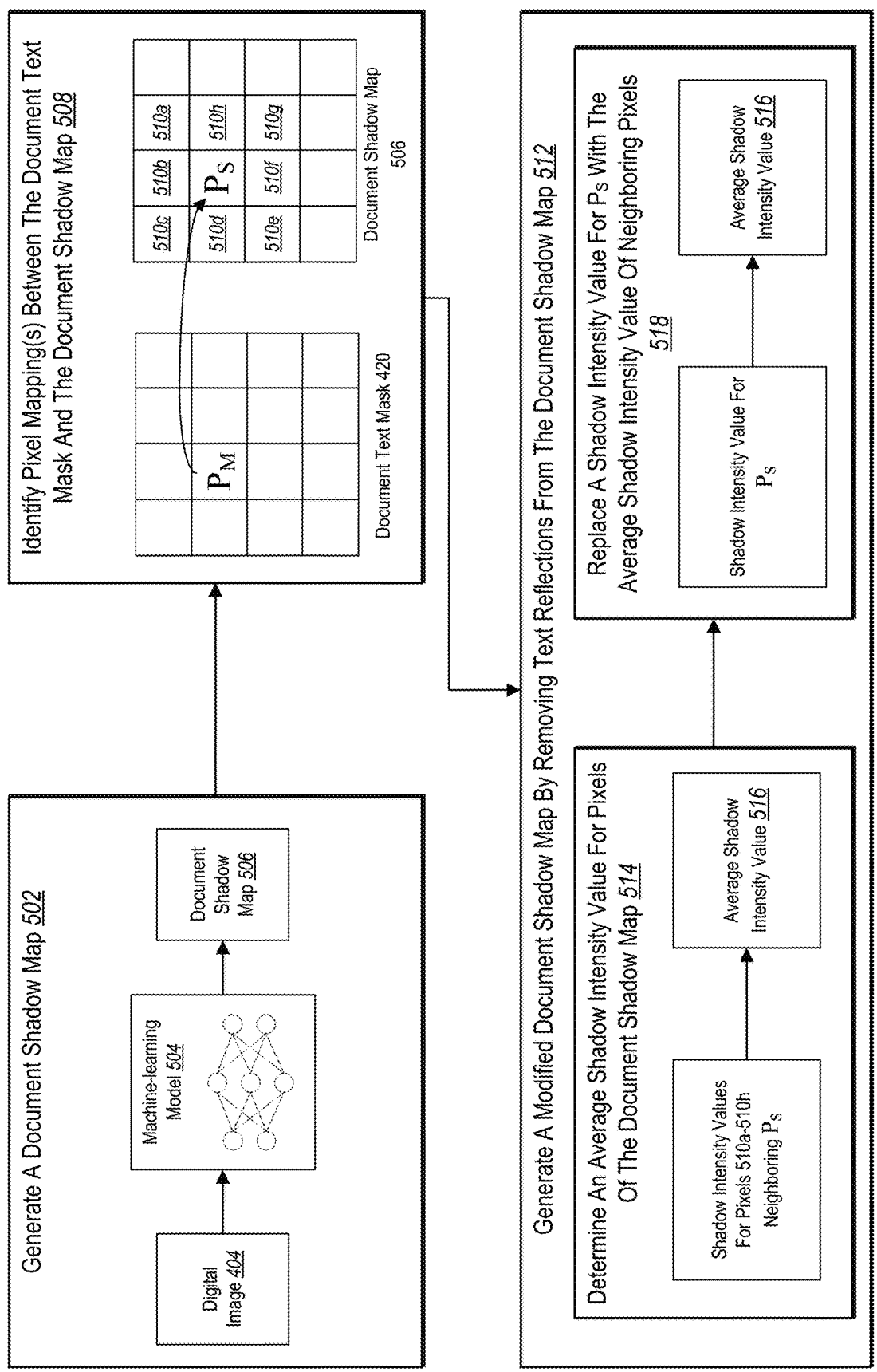
FIG. 5 illustrates the scanned text enhancement system generating a modified document shadow map in accordance with one or more embodiments.

As shown at act 502 of FIG. 5, the scanned text enhancement system 106 generates a document shadow map 506 from the digital image 404. In particular embodiments, the scanned text enhancement system 106 utilizes a machine-learning model 504 to generate the document shadow map 506. The machine-learning model 504 includes a model that is tunable (e.g., trained) based on inputs to approximate unknown functions. In particular, the machine-learning model 504 includes interconnected neurons arranged in layers that communicate and learn to approximate complex functions and generate outputs based on a plurality of inputs provided to the model. These layers can include a variety of parameters (e.g., layer weights that emphasize or de-emphasize features) that change during the learning process to improve model outputs and predictions.

In one or more embodiments, the machine-learning model 504 includes deep convolutional neural networks ("CNNs"), fully convolutional neural networks ("FCNs"), or recurrent neural networks ("RNNs") such as long short-term memory neural networks ("LSTMs"). Additionally, or alternatively, the machine-learning model 504 includes a random forest model, a series of gradient boosted decision trees (e.g., XGBoost algorithm), a multilayer perceptron, a linear regression, a support vector machine, a deep tabular learning architecture, a deep learning transformer (e.g., self-attention-based-tabular transformer), or a logistic regression. In other words, the machine-learning model 504 includes an algorithm that implements deep learning techniques or machine learning that utilizes a set of algorithms to attempt to model high-level abstractions in data.

In particular embodiments, the machine-learning model 504 comprises a shadow map generation neural network. For example, the shadow map generation neural network comprises sixteen convolutional layers (eight encoder layers and eight decoder layers) and seven skip-connection layers. Together, these layers of the shadow map generation neural network predict the shadow intensity of a given image pixel in the digital image 404.

Specifically, the eight encoder layers form a neural network encoder. The scanned text enhancement system 106 utilizes the encoder to extract feature maps from the digital image 404. In one or more embodiments, a feature map generally includes a set of numerical values representing features utilized by a neural network. To illustrate, in some instances, a feature map includes a set of values corresponding to latent and/or patent attributes and characteristics of an input analyzed by a neural network (e.g., a digital image). In one or more embodiments, the scanned text enhancement system 106 utilizes the eight encoder layers to generate features maps at different sizes or levels of abstraction. The eight decoder layers form a neural network decoder. The scanned text enhancement system 106 utilizes the skip layers to transfer features from the encoder to the decoder or among the encoder layers or decoder layers in a manner that skips one or more of the neural network layers. The scanned text enhancement system 106 utilizes the decoder to decode the feature map(s) from the encoder. To illustrate, in some instances, decodes the feature map(s) from the encoder to generate a shadow intensity value for each pixel of the digital image 404. The scanned text enhancement system 106 combines predictions for the shadow intensities (i.e., the shadow intensity values) to generate the document shadow map 506.

At act 508, the scanned text enhancement system 106 identifies one or more pixel mappings between the document text mask 420 and the document shadow map 506. In particular embodiments, the act 508 comprises identifying a black pixel $P_M$ in the document text mask 420. The scanned text enhancement system 106 identifies a pixel $P_S$ in the document shadow map 506 that corresponds to (i.e., maps to) the black pixel $P_M$ in the document text mask 420. In turn, the scanned text enhancement system 106 identifies a group of pixels 510a-510h that neighbor or surround the pixel $P_S$ in the document shadow map 506. In one or more embodiments, the scanned text enhancement system 106 identifies the group of pixels 510a-510h using a pixel window of a configurable size (e.g., w×w) centered at the pixel $P_S$ in the document shadow map 506.

At act 512, the scanned text enhancement system 106 generates a modified document shadow map by removing text reflections from the document shadow map 506. The act 512 comprises sub-acts 514, 518 discussed below.

In particular, at the sub-act 514, the scanned text enhancement system 106 determines an average shadow intensity value 516 for pixels of the document shadow map 506. Specifically, the scanned text enhancement system 106 determines the average shadow intensity value 516 for the group of pixels 510a-510h that neighbor or surround the pixel $P_S$ in the document shadow map 506. For example, the scanned text enhancement system 106 sums each individual pixel's shadow intensity value for the group of pixels 510a-510h and divides by the total number of pixels in the group of pixels 510a-510h. It will be appreciated that determining the average shadow intensity value 516 for the group of pixels 510a-510h excludes accounting for the shadow intensity values of certain pixels in the pixel window. For instance, the scanned text enhancement system 106 excludes a shadow intensity value of the pixel $P_S$ in the center of the pixel window. Additionally, or alternatively, the scanned text enhancement system 106 excludes a shadow intensity value for a pixel in the pixel window which maps to a black pixel in the document text mask 420.

At the sub-act 518, the scanned text enhancement system 106 replaces a shadow intensity value for the pixel $P_S$ with the average shadow intensity value 516 for the group of pixels 510a-510h. By using the average shadow intensity value 516 as an interpolated shadow intensity value, the scanned text enhancement system 106 removes the text reflection appearing in the pixel $P_S$ from the document shadow map 506.

In one or more embodiments, the scanned text enhancement system 106 further performs the foregoing acts (in series or in parallel) for other black pixels in the document text mask 420. For example, the scanned text enhancement system 106 performs the foregoing acts for each black pixel in the document text mask 420 until the scanned text enhancement system 106 completes generation of the modified document shadow map. In this manner, the scanned text enhancement system 106 efficiently and effectively removes text reflections from the document shadow map 506.

As discussed above, the scanned text enhancement system 106 accurately removes shadows while preserving document fidelity. In accordance with one or more embodiments, FIGS. 6A-6B illustrate the scanned text enhancement system 106 generating a shadow-removed digital image and enhancing text.

Figure 6A:
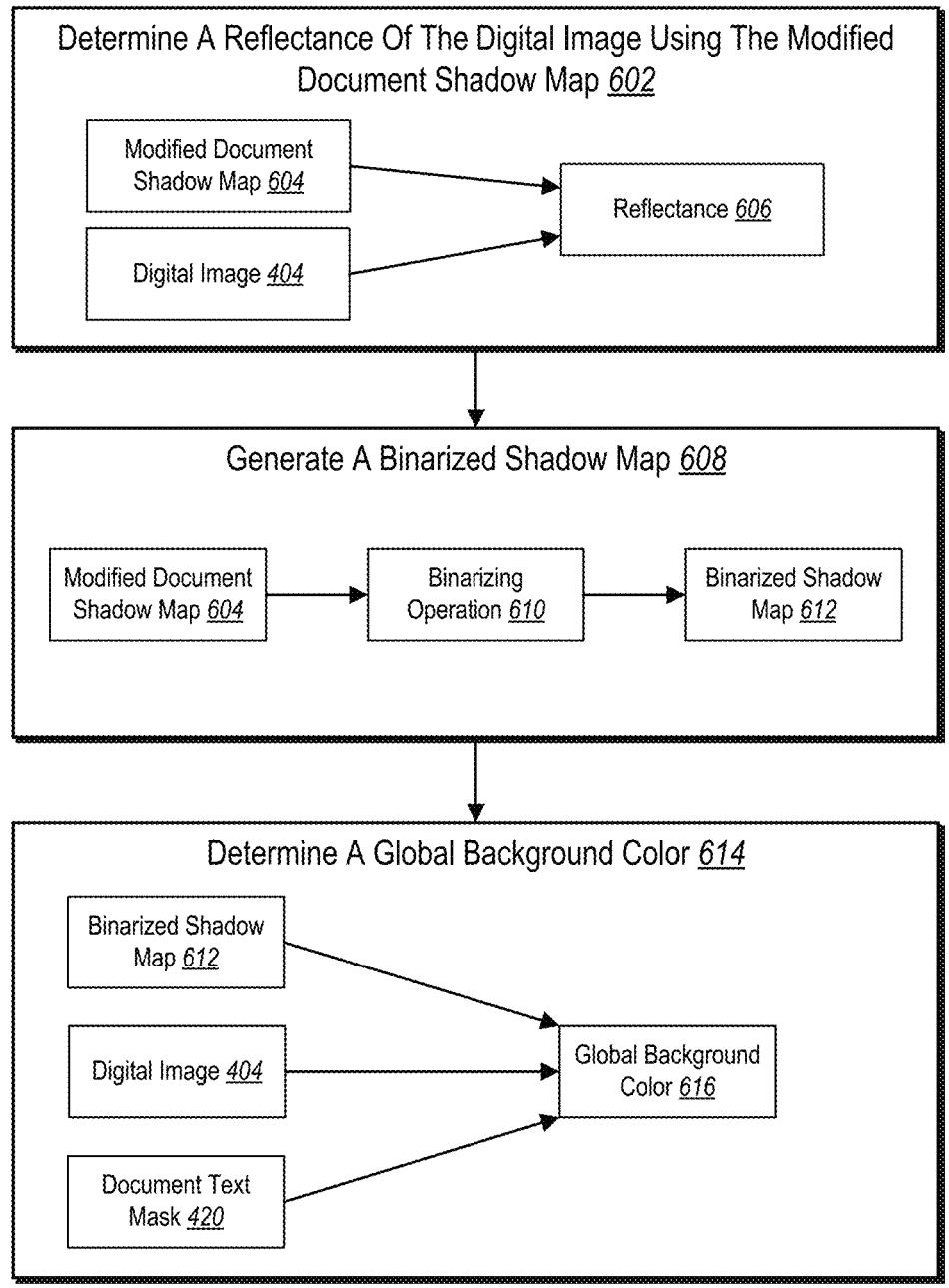
FIGS. 6A-6B illustrate the scanned text enhancement system generating a shadow-removed digital image and enhancing text in accordance with one or more embodiments.
Figure 6B:
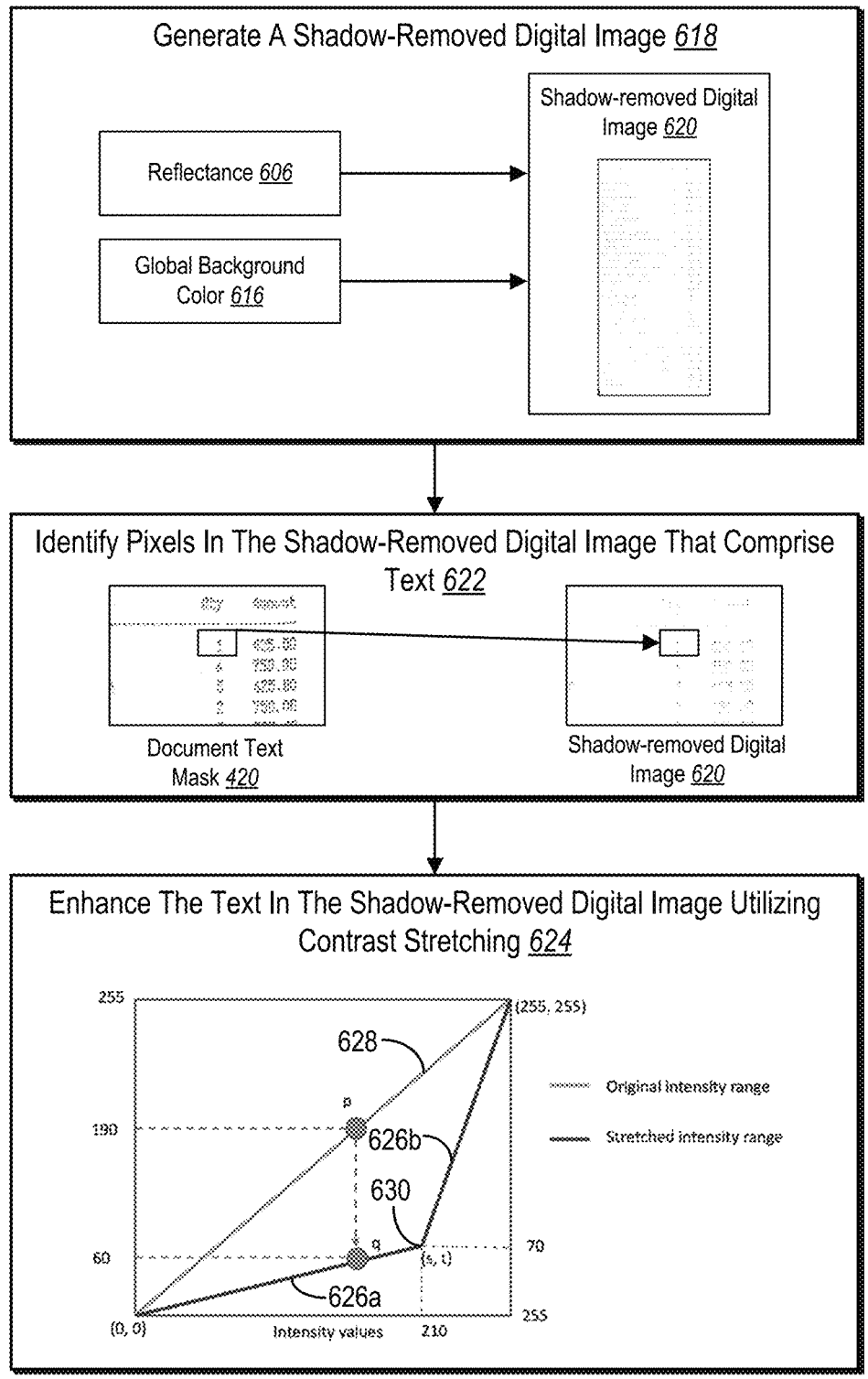

At act 602 in FIG. 6A, the scanned text enhancement system 106 determines a reflectance 606 of the digital image 404 using a modified document shadow map 604. For example, the scanned text enhancement system 106 determines the reflectance 606 by determining a ratio of pixel color values of the digital image 404 to shadow intensity values of the modified document shadow map 604. In certain implementations, the scanned text enhancement system 106 uses function (2) below to determine the reflectance 606:

$$R(x,y)=I(x,y)/S(x,y) \qquad (2)$$

where $R(x,y)$ is the reflectance of a given pixel positioned at $(x,y)$ in the digital image 404, $I(x,y)$ represents the pixel color value for the pixel positioned at $(x,y)$ in the digital image 404, and $S(x,y)$ represents the shadow intensity value for a corresponding pixel in the modified document shadow map 604. In this manner, the scanned text enhancement system 106 generates a reflectance value for each pixel in the digital image 404.

At act 608, the scanned text enhancement system 106 generates a binarized shadow map 612 from the modified document shadow map 604. In one or more embodiments, the binarized shadow map 612 comprises binary-colored pixels. For example, the binarized shadow map 612 comprises a monochrome version of the modified document shadow map 604 with foreground and background pixels in black and white color.

In particular embodiments, at act 608 the scanned text enhancement system 106 performs a binarizing operation 610. In particular, the scanned text enhancement system 106 performing one or more steps for binarizing an image. For example, the scanned text enhancement system 106 utilizes the OTSU thresholding algorithm to convert grayscale pixels to monochrome pixels. As another example, the scanned text enhancement system 106 utilizes Niblack's method related to local thresholding. In yet another example, the scanned text enhancement system 106 performs the Sauvola method, the Bernsen method, and/or other suitable binarizing methods for image processing.

At act 614, the scanned text enhancement system 106 determines a global background color 616. In one or more embodiments, the global background color 616 comprises an estimated pixel color value for background portions (e.g., white-space regions) of the digital image 404.

In particular embodiments, the act 614 comprises determining the global background color 616 based on the binarized shadow map 612, the digital image 404, and the document text mask 420. For example, in certain implementations, the scanned text enhancement system 106 generates the global background color 616 according to function (3) below:

$$\text{Color} = \frac{I(x, y) * T_{mask}(x, y) * S_{binarized}(x, y)}{T_{mask}(x, y) * S_{binarized}(x, y)} \qquad (3)$$

where Color represents the global background color 616, $I(x,y)$ represents the pixel color value for a pixel positioned at $(x,y)$ in the digital image 404, $T_{mask}(x,y)$ represents the corresponding binary pixel color value (e.g., either 0 or 255) in the document text mask 420, and $S_{binarized}(x,y)$ represents the corresponding binary pixel color value (e.g., either 0 or 255) in the binarized shadow map 612. In certain implementations, the scanned text enhancement system 106 further determines multiple values of the global background color 616 and generate an interpolated value, average value, etc. In this manner, the scanned text enhancement system 106 better preserves the color of digital image 404.

In FIG. 6B at act 618, the scanned text enhancement system 106 generates a shadow-removed digital image 620. In one or more embodiments, the shadow-removed digital image 620 comprises a cleaned version of the digital image 404 with one or more shadows removed.

In particular embodiments, the scanned text enhancement system 106 generates the shadow-removed digital image 620 based on the reflectance 606 and the global background color 616 of the digital image 404. For example, the scanned text enhancement system 106 combines the reflectance 606 and the global background color 616 according to function (4) to generate the shadow-removed digital image 620:

$$\text{ShadowRemovedImage} = R(x,y) * \text{Color} \quad (4)$$

where ShadowRemovedImage represents the shadow-removed digital image 620, R(x,y) represents the reflectance 606 for pixel-specific reflectance of the digital image 404, and Color represents the global background color 616.

At act 622, the scanned text enhancement system 106 identifies pixels in the shadow-removed digital image 620 that comprise text. In particular embodiments, the scanned text enhancement system 106 uses the document text mask 420 to guide the text identification. For example, the scanned text enhancement system 106 identifies black pixels indicative of text in the document text mask 420 to identify corresponding pixels in the shadow-removed digital image 620 that comprise text.

At act 624, the scanned text enhancement system 106 enhances the identified text in the shadow-removed digital image 620. The scanned text enhancement system 106 can use one or more different approaches to enhancing the text. For example, in one or more embodiments, the scanned text enhancement system 106 performs image preprocessing in order to enhance the text of the 620. To illustrate, the scanned text enhancement system 106 preprocesses the shadow-removed digital image 620 by converting the shadow-removed digital image 620 from an RGB image to a LAB image. In turn, the scanned text enhancement system 106 can determine lightness qualities (e.g., intensity values) of the L-channel of the shadow-removed digital image 620 in LAB format, such as a maximum and minimum intensity values. As will be explained below, the scanned text enhancement system 106 utilizes intensity values to enhance text of the shadow-removed digital image 620.

In particular embodiments, the scanned text enhancement system 106 utilizes contrast stretching to enhance (e.g., darken or lighten) the text in the shadow-removed digital image 620. For example, in certain embodiments, the scanned text enhancement system 106 utilizes linear contrast stretching. Under this approach, the scanned text enhancement system 106 uniformly stretches the intensity values for the shadow-removed digital image 620 to a desired intensity range. That is, given a range of intensity values from 83 to 153 in the shadow-removed digital image 620, the scanned text enhancement system 106 uniformly stretches these intensity values to range from 0 to 255. This linear contrast stretching is reflected in function (5) below:

$$\text{StretchedIntensity} = 255 * (\text{pixVal} - I_{min})/(I_{max} - I_{min}) \quad (5)$$

where pixVal represents the current (non-stretched) pixel intensity value, $I_{min}$ represents the minimum intensity value of the shadow-removed digital image 620, and $I_{max}$ represents the maximum intensity value of the shadow-removed digital image 620.

In other embodiments, the scanned text enhancement system 106 utilizes non-linear contrast stretching. Under this approach, the scanned text enhancement system 106 non-uniformly stretches the intensity values for the shadow-removed digital image 620 to a desired intensity range. For example, the scanned text enhancement system 106 skews more of the intensity values towards the 255 region of intensity spectrum and less of the intensity values towards the 0 region of the intensity spectrum.

In certain embodiments, non-linear contrast stretching includes identifying two or more line segments for mapping or stretching the intensity values. For instance, as shown in FIG. 6B, the scanned text enhancement system 106 identifies line segments 626a, 626b for stretching the intensity values from the original intensity range represented by line segment 628. In one or more embodiments, the scanned text enhancement system 106 defines the line segments 626a, 626b according to a predetermined point 630 connecting the line segments 626a, 626b. Indeed, the line segment 626a is defined between (0, 0) and the predetermined point 630 at (s,t), which in this case is (210, 70). Additionally, the line segment 626b is defined between the predetermined point 630 at (s,t) and (255, 255).

It will be appreciated that the predetermined point 630 positioned at (s,t) is a configurable position. In particular embodiments, the scanned text enhancement system 106 determines the predetermined point 630 based on empirical data for particular types of documents, blends of shadows, etc. In other embodiments, the scanned text enhancement system 106 predicts the position of the predetermined point 630 utilizing a machine-learning model trained to generate an optimized position for segmenting non-linear contrast stretching of intensity values. Still, in other embodiments, the predetermined point 630 is user-defined or adjustable according to user input. Further, the scanned text enhancement system 106 can position the predetermined point 630 based on the type of text enhancement (e.g., above the line segment 628 for instances where text enhancement comprises lightening the text).

The scanned text enhancement system 106 generates the stretched intensity values for non-linear contrast stretching. For example, in certain embodiments, the scanned text enhancement system 106 maps an intensity value at point p on the line segment 628 to a point q on one of the line segments 626a, 626b. The point q on one of the line segments 626a, 626b represents a stretched intensity value that maps from the point p. This mapping from p to q can be achieved by maintaining the x-value of the intensity constant and only stretching the y-value until intersecting with one of the line segments 626a, 626b.

As another example, the scanned text enhancement system 106 maps the intensity value at point p on the line segment 628 to point q on one of the line segments 626a, 626b by using line equations corresponding to the line segments 626a, 626b. For instance, the scanned text enhancement system 106 uses the line segment 626a for mapping x-values of intensity in the range [0,210], including the indicated point p with an example x-value of 190. Similarly, the scanned text enhancement system 106 can use the line segment 626b for mapping x-values of intensity in the range [210,255]. To illustrate, the scanned text enhancement system 106 can represent the line segment 626a in slope-intercept form by the expression $$y = \left(\frac{70}{210}\right)x + 0.$$

Thus, to map point p to point q, the scanned text enhancement system 106 substitutes the x-value of point p (e.g., 190) in for x in the slope intercept equation for the line segment 626a to generate the corresponding y-value (i.e., a stretched intensity value) of 63.3≈60.

In one or more embodiments, the scanned text enhancement system 106 performs (e.g., repeats) at least one of the foregoing approaches to generate a set of stretched intensity values corresponding to each of the original intensity values of the shadow-removed digital image 620.

With the stretched intensity values generated, the scanned text enhancement system 106 enhances the text in the shadow-removed digital image 620. Specifically, the scanned text enhancement system 106 changes the intensity values for each of the pixels of the shadow-removed digital image 620 identified at the act 622 as comprising text. That is, for each text pixel in the shadow-removed digital image 620, the scanned text enhancement system 106 replaces the original intensity value of the pixel with its corresponding stretched intensity value.

It will be appreciated that the scope of the present disclosure includes modifications, additions, and omissions to the foregoing acts in FIGS. 6A-6B. For example, in alternative embodiments, the scanned text enhancement system 106 enhances portions of the shadow-removed digital image 620 that include non-textual image content. To illustrate, the scanned text enhancement system 106 stretches the intensity values of pixels that comprise shapes, objects, structures, lines, foreground details, etc.

As mentioned above, the scanned text enhancement system 106, in one or more embodiments, trains a machine-learning model to efficiently and accurately generate predicted document shadow maps utilizing novel loss functions and robust synthetic training data. In accordance with one or more such embodiments, FIG. 7 illustrates the scanned text enhancement system 106 training a shadow map generation neural network 702 to generate predicted document shadow maps.

Figure 7:
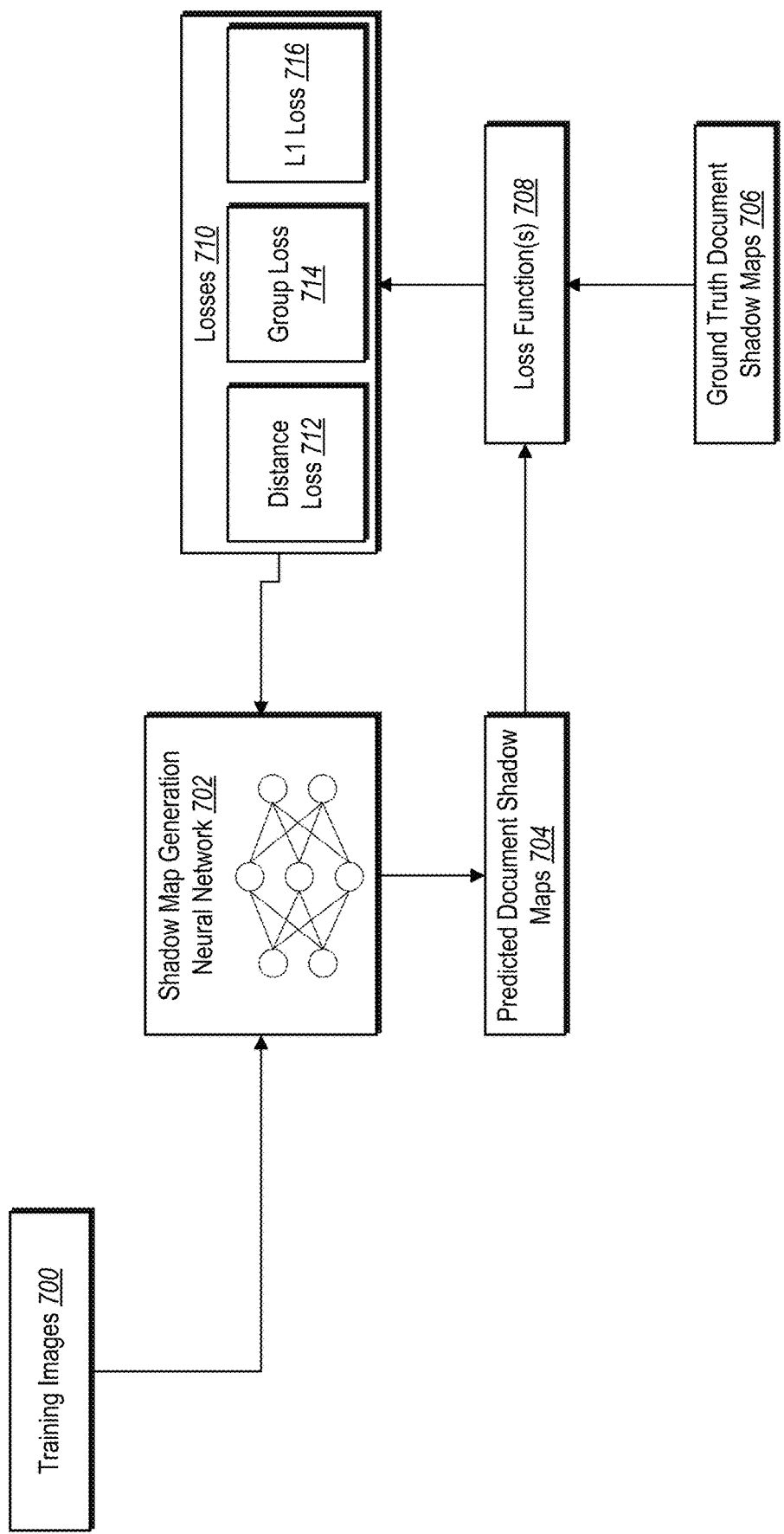
FIG. 7 illustrates the scanned text enhancement system training a shadow map generation neural network in accordance with one or more embodiments.

As shown in FIG. 7, the scanned text enhancement system 106 generates training images 700 for providing to the shadow map generation neural network 702. In particular embodiments, the scanned text enhancement system 106 generates the training images 700 by generating a synthetic dataset of digital images that comprise various types and configurations of shadows. For example, the scanned text enhancement system 106 applies fourteen (or more) different shadow types in a training image such that the training images 700 include a myriad of different blends of shadows, shadow intensities, positional arrangements of shadows, etc. In certain implementations, the training images 700 comprise a collection of 25,000 shadow blended images composed of digital images (e.g., real scans, PDF files, machine-generated images, etc.) blended with shadow images of shadows.

Based on the training images 700, the shadow map generation neural network 702 generates predicted document shadow maps 704. The predicted document shadow maps 704 comprise predicted foreground pixels that correspond to a shadow blended image of the training images 700. In addition, the predicted document shadow maps 704 comprise predicted background pixels that correspond to a shadow image.

In addition, the scanned text enhancement system 106 uses ground truth document shadow maps 706 for comparing to the predicted document shadow maps 704. In one or more embodiments, the ground truth document shadow maps 706 comprise annotations, labels, or other ground truth data. For example, the ground truth document shadow maps 706 comprise the real shadow images used to layer or blend together with digital images for generating the training images 700.

In particular embodiments, the scanned text enhancement system 106 compares the document shadow maps 704 and the ground truth document shadow maps 706 utilizing loss function(s) 708. The loss function(s) 708 return quantifiable data (e.g., losses 710) regarding the difference between a given predicted document shadow map from the document shadow maps 704 and a corresponding ground truth document shadow map from the ground truth document shadow maps 706. In particular embodiments, the loss function(s) 708 comprise a regression loss function (e.g., a mean square error function, a quadratic loss function, an L2 loss function, a mean absolute error/L1 loss function, mean bias error). Additionally, or alternatively, the loss function(s) 708 include a classification-type loss function (e.g., a hinge loss/multi-class SVM loss function, cross entropy loss/negative log likelihood function). In other embodiments, the loss function(s) 708 include a fuzzy loss function.

In particular embodiments, the loss function(s) 708 include novel loss functions for generating a distance loss 712 and a group loss 714. In certain embodiments combining losses, the losses 710 comprise a combination of the distance loss 712, the group loss 714, and an L1 loss 716. In specific embodiments, the scanned text enhancement system 106 generates a pixel-level loss comprising a distance loss, group loss, and L1 loss for each individual pixel of a predicted document shadow map. Accordingly, in one or more embodiments, the scanned text enhancement system 106 generates the losses 710 by summing up the pixel-level losses over each pixel of the predicted document shadow map.

In more detail, the scanned text enhancement system 106 uses a distance loss function for generating the distance loss 712. In particular embodiments, the scanned text enhancement system 106 uses the distance loss function to generate the distance loss 712 by penalizing a false positive pixel misclassified as a foreground pixel in a training document shadow map. To illustrate, the scanned text enhancement system 106 uses the distance loss function to generate the distance loss 712 by penalizing more heavily the false positives that are farther away from the ground truth shadow intensity.

Further, the scanned text enhancement system 106 uses a group loss function for generating the group loss 714. In particular embodiments, the scanned text enhancement system 106 uses the group loss function to generate the group loss 714 by penalizing a false negative pixel misclassified as a background pixel in the training document shadow map. To illustrate, the scanned text enhancement system 106 uses the group loss function to generate the group loss 714 by penalizing more heavily groups or sections of pixels misclassified as a background pixel. Therefore, spatially co-occurring false negative predictions in a group of pixels contribute to (e.g., add to or compound) each pixel's individual group loss value.

Based on one or more of the losses 710, the scanned text enhancement system 106 updates one or more learned parameters for the shadow map generation neural network 702. In particular embodiments, the scanned text enhancement system 106 adjusts various parameters to improve the quality/accuracy of the predicted document shadow maps 704 in subsequent training iterations—by narrowing the difference between the predicted document shadow maps 704 and the ground truth document shadow maps 706 in subsequent training iterations.

As discussed above, the scanned text enhancement system 106 receive a digital image of a scanned document and generates a corresponding enhanced digital image. In certain embodiments, the scanned text enhancement system 106 receives a digital image by efficiently leveraging a graphical user interface for capturing or uploading a digital image together with an image capturing device (e.g., camera). Further, in one or more embodiments, the scanned text enhancement system 106 generates an enhanced digital image for display within a graphical user interface. In accordance with one or more such embodiments, FIGS. 8A-8D illustrate graphical user interfaces 802a-802d of a client device 800 for generating and displaying an enhanced digital image.

Figure 8A:
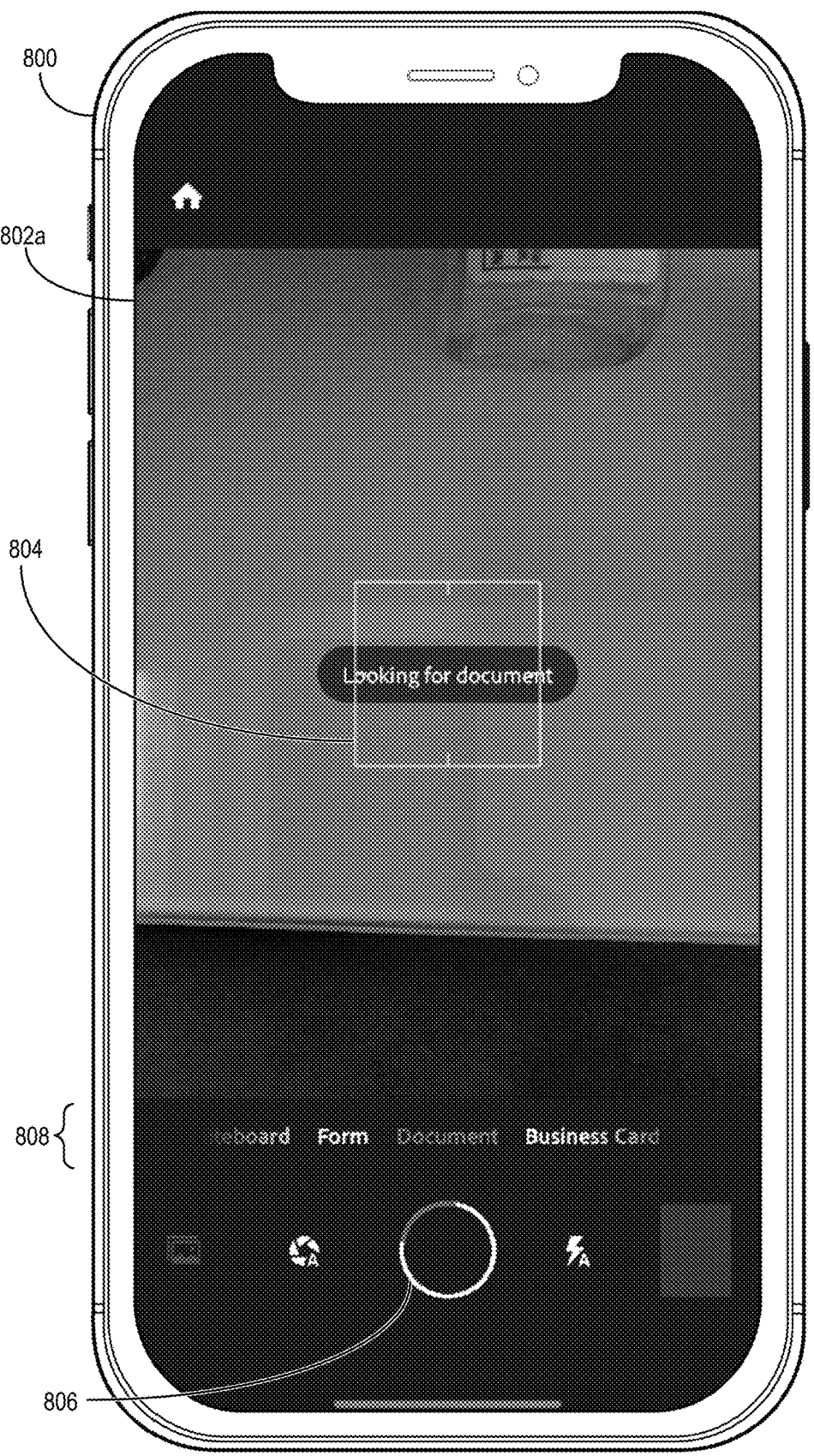
FIGS. 8A-8D illustrate graphical user interfaces generated by the scanned text enhancement system for aid in generating and displaying an enhanced digital image in accordance with one or more embodiments.

As shown in FIG. 8A, the scanned text enhancement system 106 causes the client device 800 to instantiate the graphical user interface 802a for capturing a digital image. In particular, the graphical user interface 802a comprises a camera viewfinder 804 of the client device 800. In certain embodiments, the scanned text enhancement system 106 captures a digital image of content shown in the camera viewfinder 804. For instance, the scanned text enhancement system 106 automatically captures a digital image upon detection of a certain type of content within the camera viewfinder 804. In other instances, the scanned text enhancement system 106 captures a digital image of content depicted in the camera viewfinder 804 in response to user input with a capture element 806).

In addition, the graphical user interface 802a comprises a selection menu 808 for indicating a type of content to be captured in a digital image (e.g., a whiteboard, form, document, business card, etc.). It will be appreciated that indicating a content type via the selection menu 808 can condition the scanned text enhancement system 106 for accurately generating an enhanced digital image. For example, the scanned text enhancement system 106 uses the content type to condition a machine-learning model for generating a document shadow map that is consistent with the selected content type. As another example, the scanned text enhancement system 106 uses the content type to determine enhancement parameters (e.g., a position of a predetermined point defining line segments for non-linear contrast stretching).

Figure 8B:
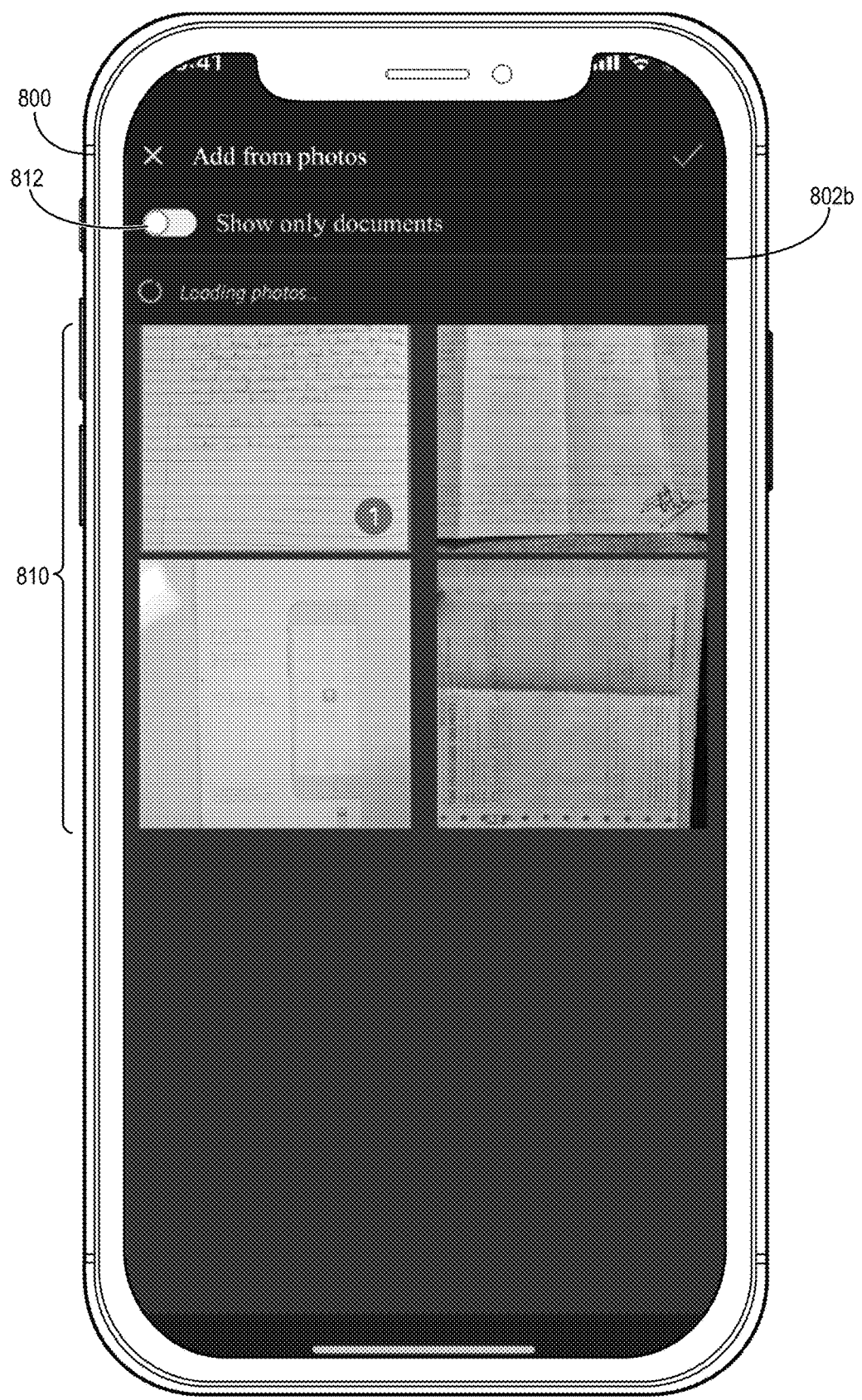

Unlike FIG. 8A for capturing a digital image, In FIG. 8B, the scanned text enhancement system 106 causes the client device 800 to instantiate the graphical user interface 802b for uploading a digital image. Indeed, as shown in FIG. 8B, the scanned text enhancement system 106 populates the graphical user interface 802b with a gallery of digital images 810. To do so, in one or more embodiments, the scanned text enhancement system 106 retrieves digital images stored in one or more memory devices on the client device 800. Additionally, or alternatively, the scanned text enhancement system 106 retrieves digital images in cloud storage accessible via the client device 800 (e.g., by way of a third-party server or third-party application).

In particular embodiments, the scanned text enhancement system 106 causes the graphical user interface 802b to generate the digital images 810 as comprising only digital images that depict a certain type of content. For example, in response to user input selecting a toggle 812, the scanned text enhancement system 106 filters the digital images 810 to only show documents. It will be appreciated however that the scanned text enhancement system 106 can similarly filter the digital images 810 to selectively show images of other content types (e.g., whiteboard images, business card images).

Figure 8C:
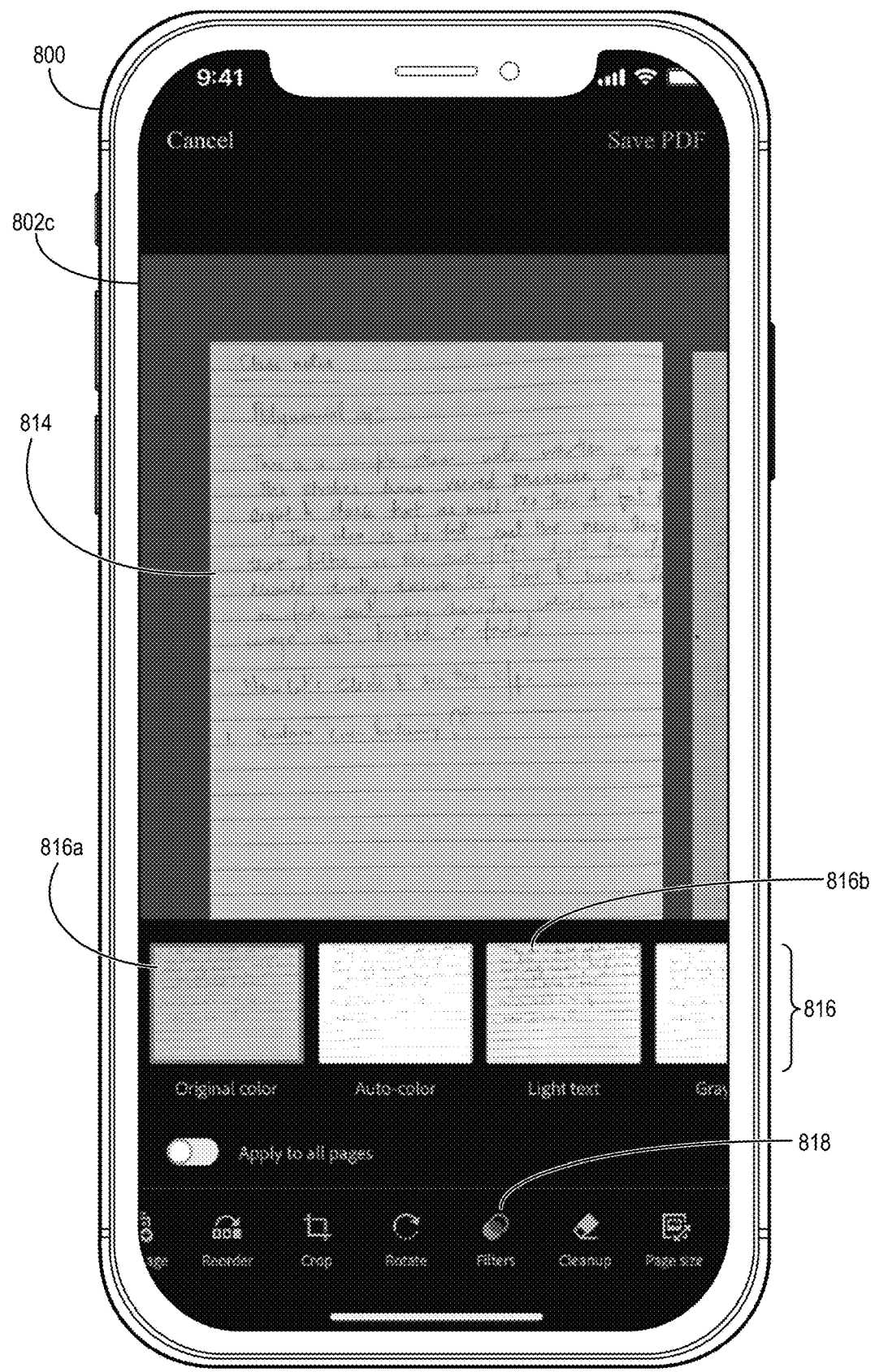

In response to a user selection of a digital image from the digital images 810, FIG. 8C shows the scanned text enhancement system 106 causing the client device 800 to instantiate the graphical user interface 802c. In particular, the graphical user interface 802c comprises a digital image 814 selected from the digital images 810. In addition, the graphical user interface 802c comprises a set of filters 816 that correspond to the digital image 814. In certain embodiments, the scanned text enhancement system 106 causes the scanned text enhancement system 106 to present the set of filters 816 based on a user selection of a filters element 818.

In particular, the set of filters 816 also include preview panes that depict a preview of what the digital image 814 would look like if the corresponding filter were selected. For example, a preview pane for a filter 816a (which is currently selected in FIG. 8C) depicts the digital image 814 in an unmodified state corresponding to the "Original Color" filter. Noticeably, the digital image 814 comprises document shadows and light text—making the handwritten notes difficult to read. Additionally, for example, a previous pane for a filter 816b depicts an enhanced digital image corresponding to the "Light Text" filter.

To generate this preview pane for the filter 816b (e.g., the "Light Text" filter), the scanned text enhancement system 106 performs acts as described in relation to the foregoing figures. For example, the scanned text enhancement system 106 generates a document text mask from the digital image 814 utilizing adaptive filtering. In addition, the scanned text enhancement system 106 determines a document shadow map of the digital image 814 utilizing a machine-learning model. In turn, the scanned text enhancement system 106 generates a modified document shadow map based on the document text mask. Then, the scanned text enhancement system 106 generates an enhanced digital image based on the modified document shadow map and the document text mask. The scanned text enhancement system 106 can present a thumbnail image of the enhanced digital image as the preview pane for the filter 816b.

Figure 8D:
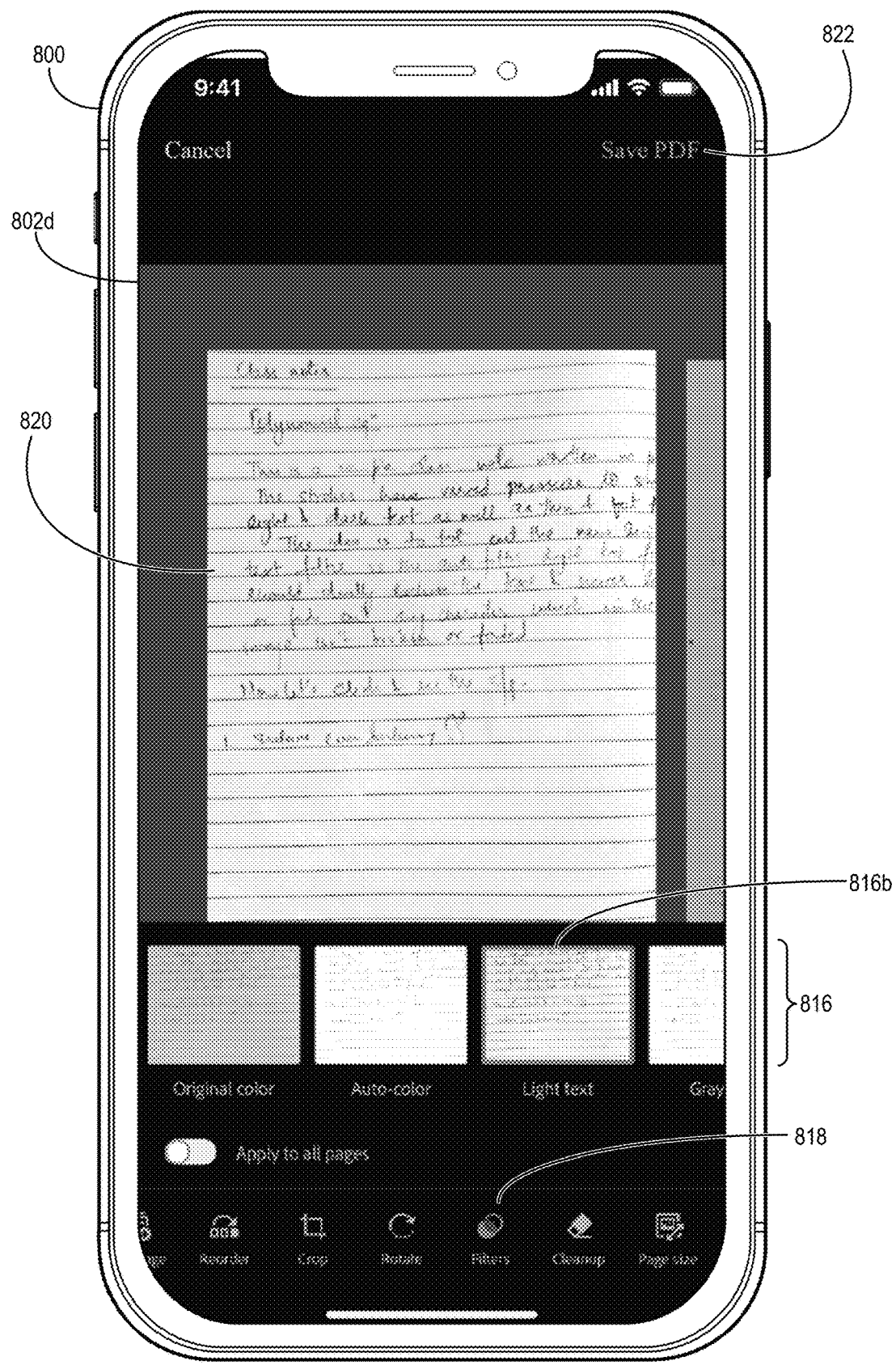

In response to a user selection of the filter 816b, FIG. 8D shows the scanned text enhancement system 106 causing the client device 800 to instantiate the graphical user interface 802d. In particular, the graphical user interface 802d comprises a display of an enhanced digital image 820 for viewing and/or user interaction. Such user interactions may include editing, sharing, or saving into one or more file formats (e.g., via a save button 822).

Moreover, the enhanced digital image 820 visually shows in prominent fashion the image enhancements previewed for the filter 816b. Specifically, the enhanced digital image 820 comprises darkened text and shadow removal—thereby improving document readability relative to the digital image 814. Accordingly, the scanned text enhancement system 106 efficiently and accurately generates enhanced document images for display while preserving document fidelity.

Figure 9A:
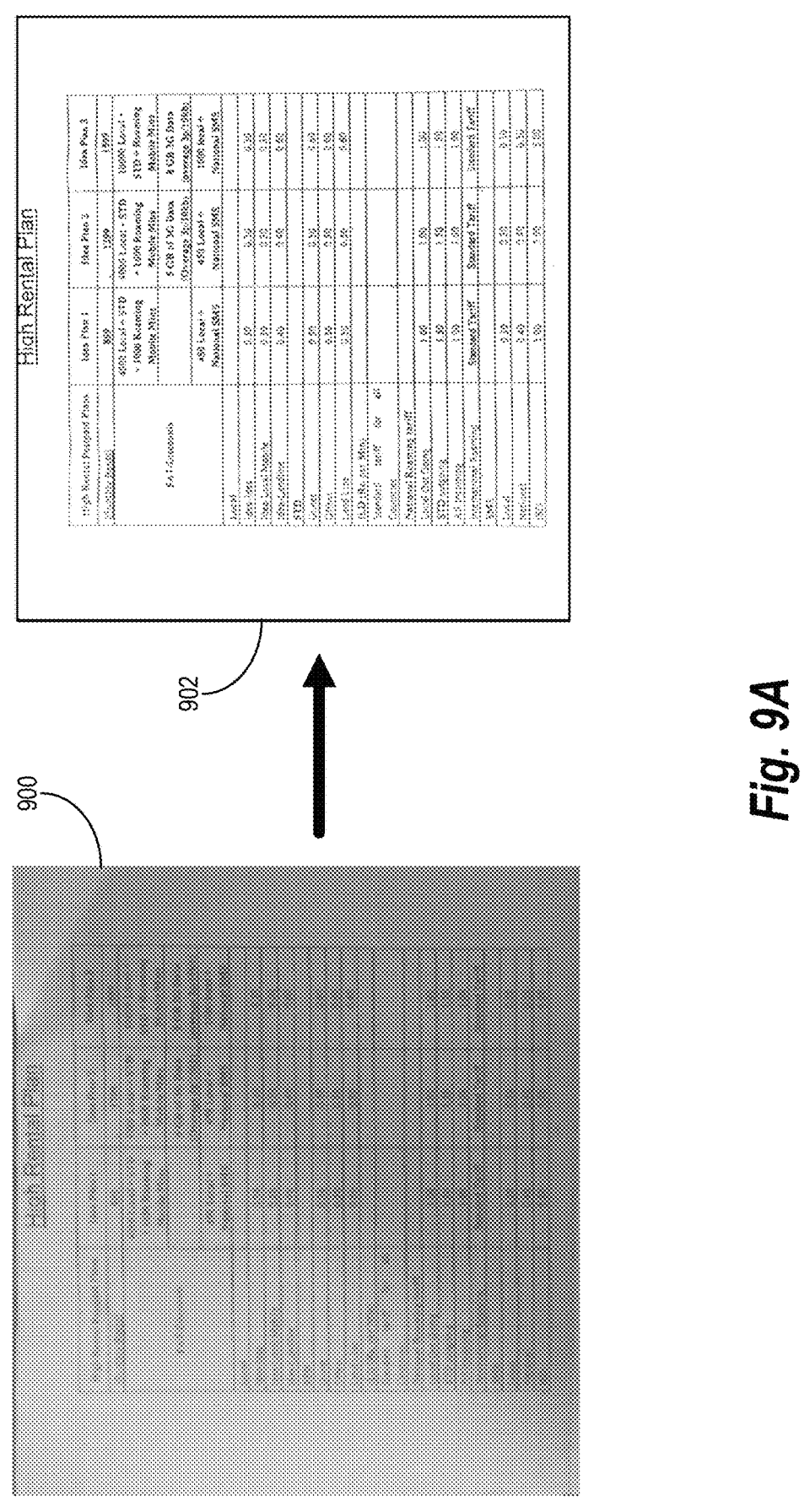
Figure 9B:
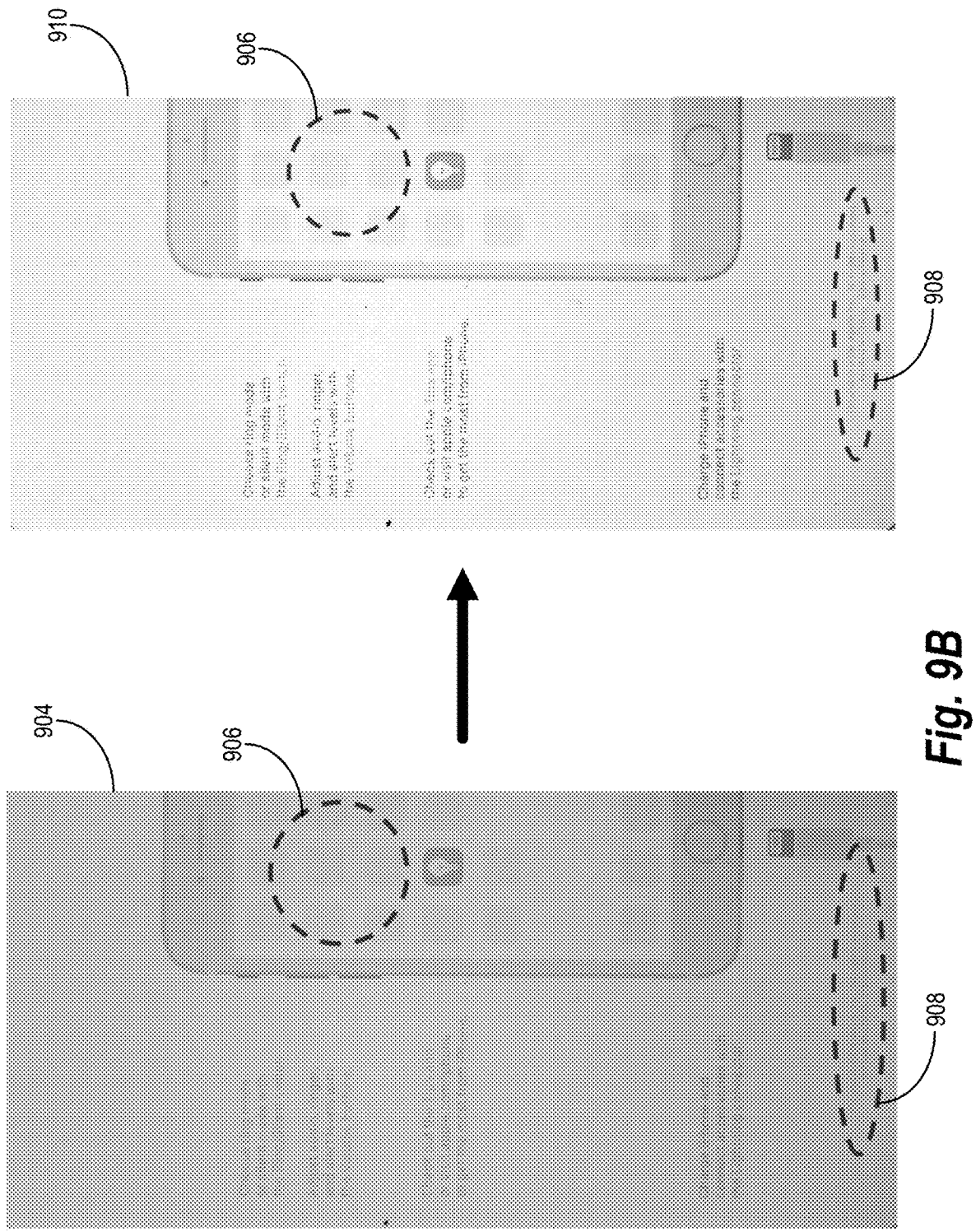

As discussed above, the scanned text enhancement system 106 removes document shadows and enhances text for digital images portraying a wide variety of content. In accordance with one or more embodiments, FIGS. 9A-9B illustrate experimental results of implementing the scanned text enhancement system 106. In particular, FIG. 9A illustrates a digital image 900 portraying a scanned table of rows and columns with textual content. The document shadows and light text render a significant portion of the digital image 900. Using the digital image 900, the scanned text enhancement system 106 generates an enhanced digital image 902. As evidenced, the enhanced digital image 902 is devoid of shadows. In addition, the enhanced digital image comprises darkened text. The scanned text enhancement system 106 therefore significantly improves readability in the enhanced digital image 902 compared to the digital image 900.

Similarly, FIG. 9B shows a digital image 904 with shadows and light text. In particular, at an image portion 906, the digital image 904 depicts icon squares displayed in a user interface of a client device. Notably, the icon squares in the image portion 906 are heavily faded. In addition, text at an image portion 908 is likewise heavily faded. The scanned text enhancement system 106 generates an enhanced digital image 910 based on the digital image 904. In the enhanced digital image 910, the scanned text enhancement system 106 removes shadows. Further, the scanned text enhancement system 106 enhances the visibility of the icon squares in the image portion 906 and the text in the image portion 908.

Additional experimental results are shown below in relation to Tables 1 and 2.

TABLE 1

Survey ratings from iOS users
iOS Devices

| | Conventional Image System | Scanned text enhancement system 106 |
|---|---|---|
| Bad | 34% | 5% |
| Good | 62% | 67% |
| Excellent | 4% | 28% |

TABLE 2

Survey ratings from Android users
Android Devices

| | Conventional Image System | Scanned text enhancement system 106 |
|---|---|---|
| Bad | 36% | 5% |
| Good | 60% | 65% |
| Excellent | 4% | 30% |

From Tables 1 and 2, experimenters determined that the scanned text enhancement system 106 provided a significant improvement across iOS and Android devices in terms of image cleaning quality by enhancing texts in documents and reducing "bad" rated files from approximately 34% to approximately 5%. Further, the scanned text enhancement system 106 provided an increase in "good" and "excellent" rated cases from about 66% to about 95%.

Figure 10:
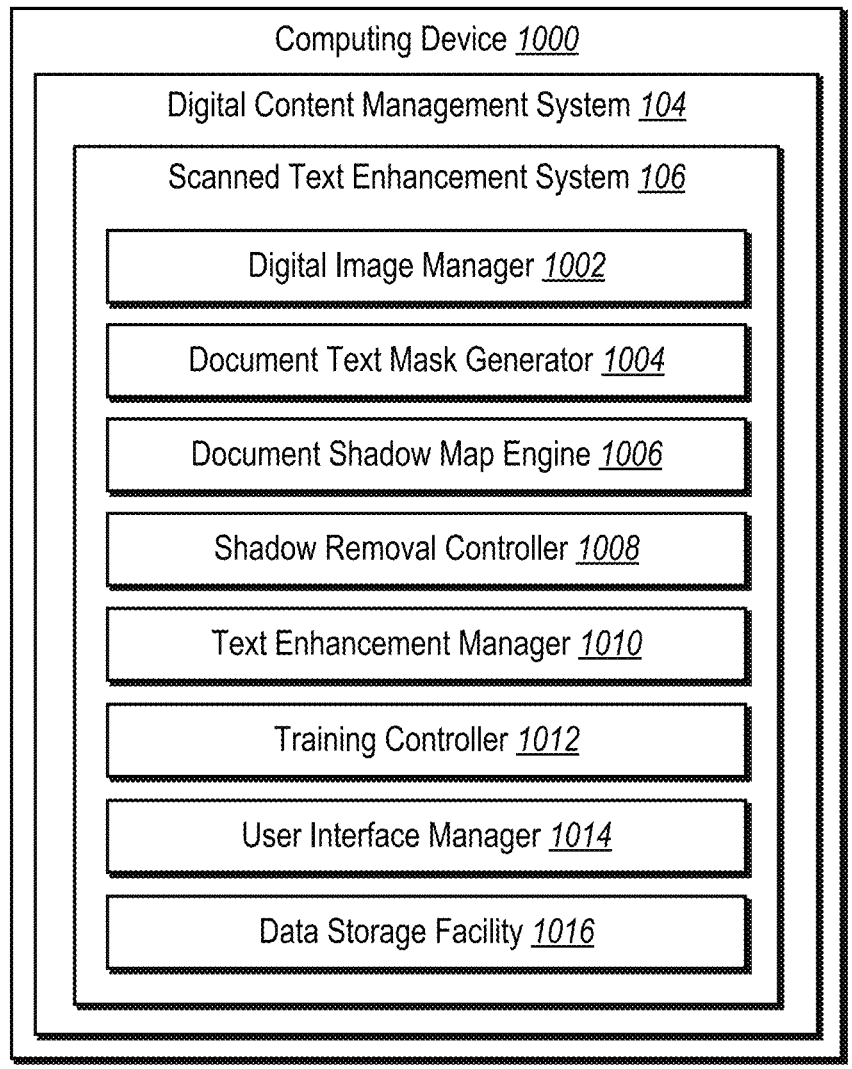
FIG. 10 illustrates a schematic diagram an example architecture of the scanned text enhancement system in accordance with one or more embodiments.

Turning to FIG. 10, additional detail will now be provided regarding various components and capabilities of the scanned text enhancement system 106. In particular, FIG. 10 illustrates an example schematic diagram of a computing device 1000 (e.g., the server(s) 102 and/or the client device 108) implementing the scanned text enhancement system 106 in accordance with one or more embodiments of the present disclosure. As shown, the scanned text enhancement system 106 is implemented by the digital content management system 104. Also illustrated, the scanned text enhancement system 106 includes a digital image manager 1002, a document text mask generator 1004, a document shadow map engine 1006, a shadow removal controller 1008, a text enhancement manager 1010, a training controller 1012, a user interface manager 1014, and a data storage facility 1016.

The digital image manager 1002 can transmit, store, request, or receive digital images (as described in relation to the foregoing figures). For example, the digital image manager 1002 can receive digital images via user upload of digital images or by utilizing a scanning element to capture the digital images.

The document text mask generator 1004 generates document text masks (as described in relation to the foregoing figures). In particular embodiments, the document text mask generator 1004 generates a gradient image and an integral image from a digital image. Additionally, the document text mask generator 1004 compares pixel color values for a pixel of the gradient image and an average pixel color value in the integral image. Based on the comparison, the scanned text enhancement system 106 determines whether a pixel in the gradient image corresponds to a foreground or background pixel in the document text mask.

The document shadow map engine 1006 generates document shadow maps (as described in relation to the foregoing figures). In particular embodiments, the document shadow map engine 1006 utilizes a machine-learning model to generate shadow intensity predictions.

The shadow removal controller 1008 removes shadows from a digital image (as described in relation to the foregoing figures). For example, the shadow removal controller 1008 generates a modified document shadow map by removing text reflections from a document shadow map. In addition, the shadow removal controller 1008 determines a reflectance and a global background color based on the modified document shadow map. Utilizing the modified document shadow map, the shadow removal controller 1008 generates a shadow-removed digital image.

The text enhancement manager 1010 enhances image portions of a shadow-removed digital image (as described in relation to the foregoing figures). In particular embodiments, the text enhancement manager 1010 darkens or lightens text utilizing contrast stretching of intensity values.

The training controller 1012 generates losses for updating one or more parameters of a machine-learning model that generates a document shadow map (as described in relation to the foregoing figures). In particular embodiments, the training controller 1012 generates a group loss and a distance loss that accounts for false negative and false positive misclassifications of pixels in a training document shadow map.

In one or more embodiments, the user interface manager 1014 provides, manages, and/or controls a graphical user interface (or simply "user interface"). In particular embodiments, the user interface manager 1014 generates and displays a user interface by way of a display screen composed of a plurality of graphical components, objects, and/or elements that allow a user to perform a function. For example, the user interface manager 1014 receives user inputs from a user, such as a click/tap to upload or capture a digital image. Additionally, in one or more embodiments, the user interface manager 1014 presents a variety of types of information, including text, enhanced digital images, or other information for presentation in a user interface.

The data storage facility 1016 maintains data for the scanned text enhancement system 106. The data storage facility 1016 (e.g., via one or more memory devices) maintains data of any type, size, or kind, as necessary to perform the functions of the scanned text enhancement system 106. For example, the data storage facility 1016 stores digital images (e.g., for user editing). As another example, the data storage facility 1016 stores a machine-learning model for generating document shadow maps.

Each of the components of the computing device 1000 can include software, hardware, or both. For example, the components of the computing device 1000 can include one or more instructions stored on a computer-readable storage medium and executable by processors of one or more computing devices, such as a client device or server device. When executed by the one or more processors, the computer-executable instructions of the scanned text enhancement system 106 can cause the computing device(s) (e.g., the computing device 1000) to perform the methods described herein. Alternatively, the components of the computing device 1000 can include hardware, such as a special-purpose processing device to perform a certain function or group of functions. Alternatively, the components of the computing device 1000 can include a combination of computer-executable instructions and hardware.

Furthermore, the components of the computing device 1000 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 1000 may be implemented as a stand-alone application, such as a desktop or mobile application. Furthermore, the components of the computing device 1000 may be implemented as one or more web-based applications hosted on a remote server.

The components of the computing device 1000 may also be implemented in a suite of mobile device applications or "apps." To illustrate, the components of the computing device 1000 may be implemented in an application, including but not limited to, ADOBE® SCAN, ACROBAT®, LIGHTROOM®, PHOTOSHOP®, ADOBE® DOCUMENT CLOUD®, etc. Product names, including "ADOBE" and any other portion of one or more of the foregoing product names, may include registered trademarks or trademarks of Adobe Inc. in the United States and/or other countries.

Figure 11:
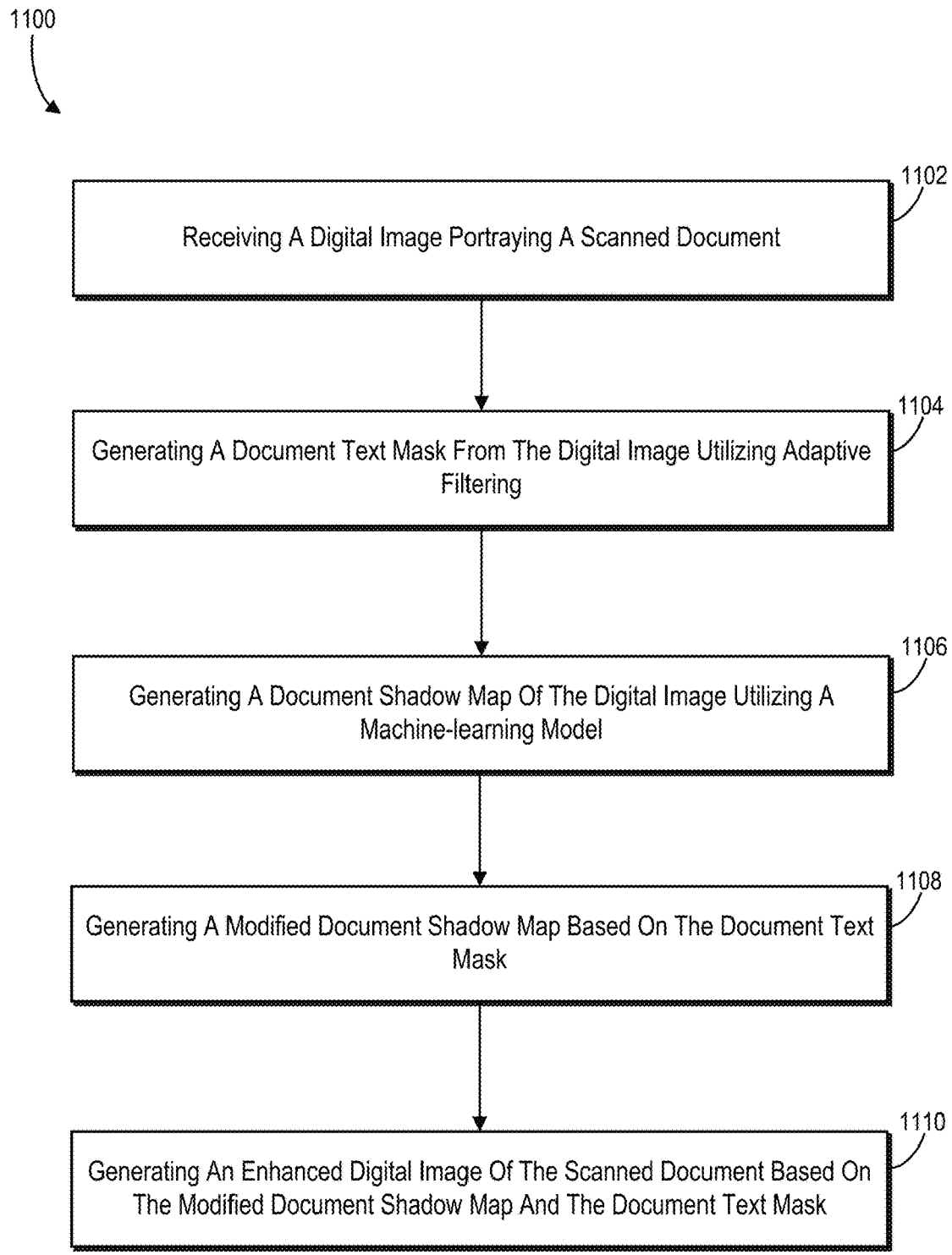
FIG. 11 illustrates a flowchart of a series of acts for generating an enhanced digital image with enhanced text in accordance with one or more embodiments.

FIGS. 1-10, the corresponding text, and the examples provide several different systems, methods, techniques, components, and/or devices of the scanned text enhancement system 106 in accordance with one or more embodiments. In addition to the above description, one or more embodiments can also be described in terms of flowcharts including acts for accomplishing a particular result. For example, FIG. 11 illustrates a flowchart of a series of acts 1100 for generating an enhanced digital image in accordance with one or more embodiments. The scanned text enhancement system 106 may perform one or more acts of the series of acts 1100 in addition to or alternatively to one or more acts described in conjunction with other figures. While FIG. 11 illustrates acts according to one embodiment, alternative embodiments may omit, add to, reorder, and/or modify any of the acts shown in FIG. 11. In one or more embodiments, the acts of FIG. 11 are performed as part of a method. Alternatively, a non-transitory computer-readable medium comprises instructions that, when executed by one or more processors, cause a computing device to perform the acts of FIG. 11. In some embodiments, a system is configured to perform the acts of FIG. 11.

As shown, the series of acts 1100 includes act 1102 of receiving a digital image portraying a scanned document. In some embodiments, receiving the digital image of the scanned document comprising using a scanning element (e.g., a scanner or camera) configured to capture and generate digital representations of physical documents.

The series of acts 1100 also includes act 1104 of generating a document text mask from the digital image utilizing adaptive filtering. In some embodiments, generating the document text mask from the digital image utilizing adaptive filtering comprises: comparing the pixel color value of the pixel in the gradient image and the average pixel color value for the group of pixels in the integral image; and determining the pixel in the gradient image corresponds to either a foreground pixel or a background pixel of the document text mask based on the comparison.

In addition, the series of acts 1100 includes act 1106 of generating a document shadow map of the digital image utilizing a machine-learning model. In some embodiments, determining the document shadow map of the digital image utilizing the machine-learning model comprises determining a shadow intensity of each pixel in the digital image using a shadow map generation neural network.

Further, the series of acts 1100 includes act 1108 of generating a modified document shadow map based on the document text mask. In some embodiments, generating the modified document shadow map comprises removing text reflections from the document shadow map by: determining an average shadow intensity value for the group of neighboring pixels in the document shadow map; and replacing a shadow intensity value of the mapped pixel in the document shadow map with the average shadow intensity value for the group of neighboring pixels in the document shadow map.

The series of acts 1100 additionally includes act 1110 of generating an enhanced digital image of the scanned document based on the modified document shadow map and the document text mask. In some embodiments, generating the enhanced digital image comprises: utilizing black pixels of the document text mask to identify corresponding pixels in the shadow-removed digital image comprising text; and utilizing non-linear contrast stretching to enhance the text in the shadow-removed digital image.

It is understood that the outlined acts in the series of acts 1100 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 11, act(s) in the series of acts 1100 may include act of: generating a gradient image and an integral image from the digital image; and determining, for a pixel in the gradient image having a pixel color value satisfying a threshold pixel color value, an average pixel color value in the integral image for a group of pixels that maps to a corresponding group of pixels neighboring the pixel in the gradient image.

As another example of an additional act not shown in FIG. 11, act(s) in the series of acts 1100 may include act of: identifying a black pixel in the document text mask; and identifying a mapped pixel and a group of neighboring pixels in the document shadow map that correspond to the black pixel in the document text mask.

As a further example of an additional act not shown in FIG. 11, act(s) in the series of acts 1100 may include act of: determining a reflectance of the digital image using the modified document shadow map; and generating a binarized shadow map by binarizing the modified document shadow map.

In still another example of an additional act not shown in FIG. 11, act(s) in the series of acts 1100 may include act of: determining a global background color based on the digital image, the document text mask, and the binarized shadow map; and generating a shadow-removed digital image by removing shadows from the digital image based on combining the reflectance of the digital image and the global background color.

Additionally, another example of an additional act not shown in FIG. 11 includes act(s) in the series of acts 1100 of, in response to receiving the digital image, providing, for display within a graphical user interface, a selectable image filter for converting the digital image to the enhanced digital image.

In another example of an additional act not shown in FIG. 11, act(s) in the series of acts 1100 may include act of: scanning a document to generate a digital image of the document; generating a document text mask from the digital image by using a histogram-stretched gradient image and an integral image based on the digital image to identify pixels in the histogram-stretched gradient image as foreground pixels or background pixels; determining a document shadow map of the digital image utilizing the machine-learning model; generating a modified document shadow map by removing text reflections in the document shadow map based on the document text mask; generating a shadow-removed digital image by removing shadows from the digital image based on the modified document shadow map and the document text mask; and generating an enhanced digital image of the document by utilizing contrast stretching to enhance text in the shadow-removed digital image.

In particular embodiments, an additional act not shown in FIG. 11 includes act(s) in the series of acts 1100 of generating the document text mask by: determining, for a dark pixel in the histogram-stretched gradient image, an average pixel color value in the integral image for a group of pixels that maps to a corresponding group of pixels neighboring the dark pixel in the histogram-stretched gradient image; comparing a pixel color value of the dark pixel in the histogram-stretched gradient image and the average pixel color value for the group of pixels in the integral image; and determining the dark pixel in the histogram-stretched gradient image corresponds to either a foreground pixel or a background pixel of the document text mask based on the comparison.

As another example of an additional act not shown in FIG. 11, act(s) in the series of acts 1100 may include act of generating the modified document shadow map by: identifying a black pixel in the document text mask; identifying a mapped pixel and a group of neighboring pixels in the document shadow map that correspond to the black pixel in the document text mask; determining an average shadow intensity value for the group of neighboring pixels in the document shadow map; and replacing a shadow intensity value of the mapped pixel in the document shadow map with the average shadow intensity value for the group of neighboring pixels in the document shadow map.

In yet another example of an additional act not shown in FIG. 11, act(s) in the series of acts 1100 may include act of generating the shadow-removed digital image by: determining a reflectance of the digital image using the modified document shadow map; generating a binarized shadow map by binarizing the modified document shadow map; determining a global background color based on the digital image, the document text mask, and the binarized shadow map; and removing the shadows from the digital image based on combining the reflectance of the digital image and the global background color.

In a further example of an additional act not shown in FIG. 11, act(s) in the series of acts 1100 may include act of generating the enhanced digital image by: utilizing black pixels of the document text mask to identify corresponding pixels in the shadow-removed digital image comprising text; and utilizing non-linear contrast stretching to darken the text in the shadow-removed digital image.

Additionally, in another example of an additional act not shown in FIG. 11, act(s) in the series of acts 1100 may include act of: determining, based on a ground truth document shadow map, a distance loss for a false positive pixel misclassified as a foreground pixel in a training document shadow map; determining, based on the ground truth document shadow map, a group loss for a false negative pixel misclassified as a background pixel in the training document shadow map; and generating one or more learned parameters for the machine-learning model based on the distance loss and the group loss.

In yet another example of an additional act not shown in FIG. 11, act(s) in the series of acts 1100 may include act of: receiving a digital image by importing the digital image or scanning a document to generate the digital image; determining a document shadow map of the digital image utilizing a machine-learning model; generating a modified document shadow map based on the document text mask; generating an enhanced digital image of the document based on the modified document shadow map and the document text mask; providing, for display within a graphical user interface, a selectable image filter for viewing the enhanced digital image; and providing, for display within the graphical user interface, the enhanced digital image in response to identifying a user input indicating a selection of the selectable image filter.

In a further example of an additional act not shown in FIG. 11, act(s) in the series of acts 1100 may include act of generating the document text mask by using a histogram-stretched gradient image and an integral image based on the digital image to identify pixels in the histogram-stretched gradient image as foreground pixels or background pixels.

In still another example of an additional act not shown in FIG. 11, act(s) in the series of acts 1100 may include act of generating the modified document shadow map by removing text reflections in the document shadow map based on the document text mask.

In particular embodiments, an additional act not shown in FIG. 11 includes act(s) in the series of acts 1100 of generating a shadow-removed digital image by removing shadows from the digital image based on the modified document shadow map and the document text mask, wherein generating the enhanced digital image of the document comprises utilizing contrast stretching to enhance text in the shadow-removed digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
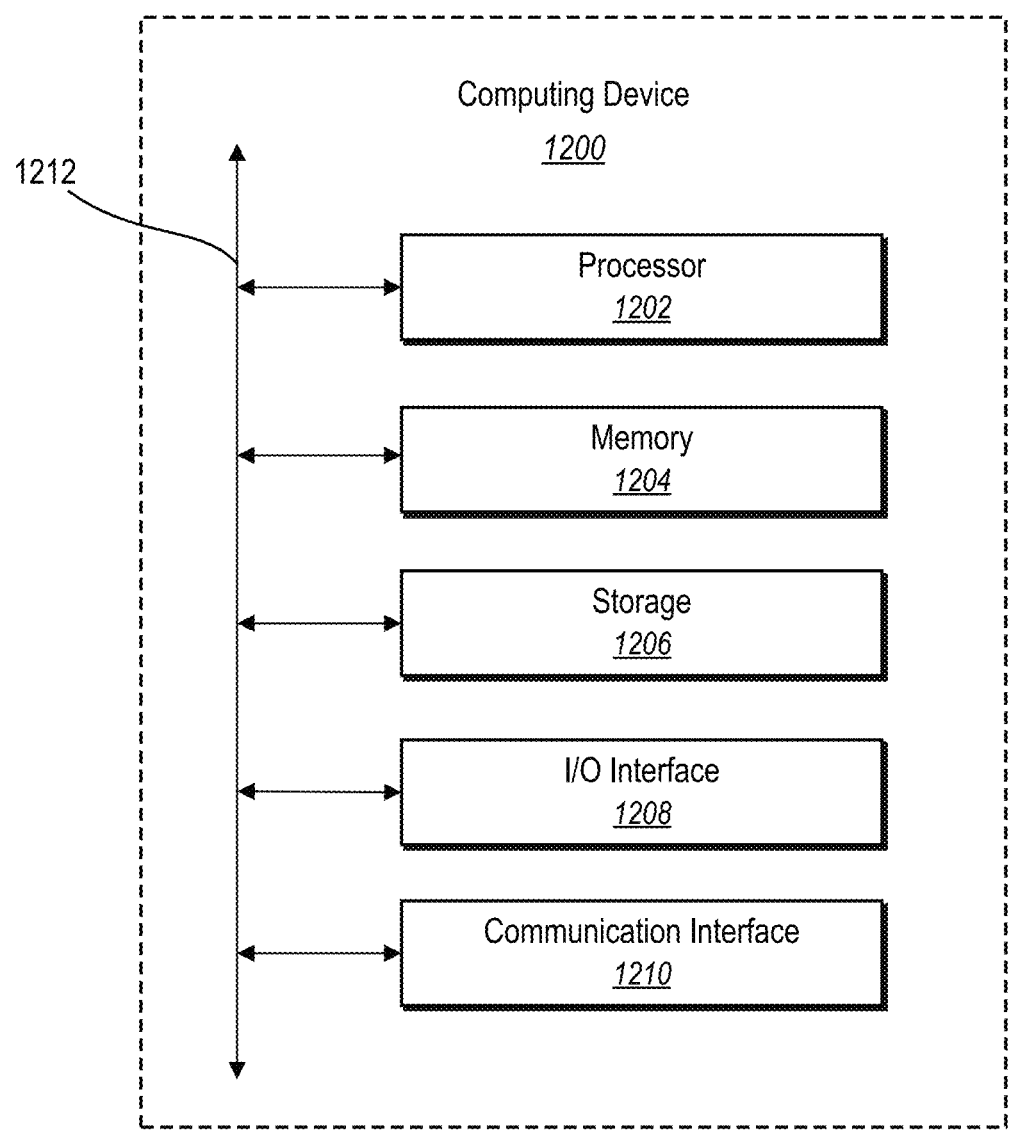
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102, the client device 108, and/or the computing device 1000). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of the computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to perform operations comprising:
    receiving a digital image portraying a scanned document;
    generating a document text mask from the digital image utilizing adaptive filtering;
    generating a document shadow map of the digital image utilizing a machine-learning model;
    generating a modified document shadow map based on the document text mask; and
    generating an enhanced digital image of the scanned document based on the modified document shadow map and the document text mask;
    providing, for display within a graphical user interface, a selectable image filter for viewing the enhanced digital image; and
    providing, for display within the graphical user interface, the enhanced digital image in response to identifying a user input indicating a selection of the selectable image filter.

2. The non-transitory computer-readable medium of claim 1, further comprising instructions that, when executed by the at least one processor, cause the computing device to perform operations comprising:
    generating a gradient image and an integral image from the digital image; and
    determining, for a pixel in the gradient image having a pixel color value satisfying a threshold pixel color value, an average pixel color value in the integral image for a group of pixels that maps to a corresponding group of pixels neighboring the pixel in the gradient image.

3. The non-transitory computer-readable medium of claim 2, wherein generating the document text mask from the digital image utilizing adaptive filtering comprises:
    comparing the pixel color value of the pixel in the gradient image and the average pixel color value for the group of pixels in the integral image; and determining the pixel in the gradient image corresponds to either a foreground pixel or a background pixel of the document text mask based on the comparison.

4. The non-transitory computer-readable medium of claim 1, wherein generating the document shadow map of the digital image utilizing the machine-learning model comprises determining a shadow intensity of each pixel in the digital image using a shadow map generation neural network.

5. The non-transitory computer-readable medium of claim 1, further comprising instructions that, when executed by the at least one processor, cause the computing device to perform operations comprising:
   identifying a black pixel in the document text mask; and
   identifying a mapped pixel and a group of neighboring pixels in the document shadow map that correspond to the black pixel in the document text mask.

6. The non-transitory computer-readable medium of claim 5, wherein generating the modified document shadow map comprises removing text reflections from the document shadow map by:
   determining an average shadow intensity value for the group of neighboring pixels in the document shadow map; and
   replacing a shadow intensity value of the mapped pixel in the document shadow map with the average shadow intensity value for the group of neighboring pixels in the document shadow map.

7. The non-transitory computer-readable medium of claim 1, further comprising instructions that, when executed by the at least one processor, cause the computing device to perform operations comprising:
   determining a reflectance of the digital image using the modified document shadow map; and
   generating a binarized shadow map by binarizing the modified document shadow map.

8. The non-transitory computer-readable medium of claim 7, further comprising instructions that, when executed by the at least one processor, cause the computing device to perform operations comprising:
   determining a global background color based on the digital image, the document text mask, and the binarized shadow map; and
   generating a shadow-removed digital image by removing shadows from the digital image based on combining the reflectance of the digital image and the global background color.

9. The non-transitory computer-readable medium of claim 8, wherein generating the enhanced digital image comprises:
   utilizing black pixels of the document text mask to identify corresponding pixels in the shadow-removed digital image comprising text; and
   utilizing non-linear contrast stretching to enhance the text in the shadow-removed digital image.

10. The non-transitory computer-readable medium of claim 1, further comprising instructions that, when executed by the at least one processor, cause the computing device to perform operations comprising:
   receiving the digital image of the scanned document by using a scanning element configured to capture and generate digital representations of physical documents; and
   in response to receiving the digital image, providing, for display within the graphical user interface, the selectable image filter for converting the digital image to the enhanced digital image.

11. A computer-implemented method comprising:
   receiving a digital image by importing the digital image or scanning a document to generate the digital image;
   generating a document text mask from the digital image utilizing adaptive filtering;
   generating a document shadow map of the digital image utilizing a machine-learning model;
   generating a modified document shadow map based on the document text mask;
   generating an enhanced digital image of the document based on the modified document shadow map and the document text mask;
   providing, for display within a graphical user interface, a selectable image filter for viewing the enhanced digital image; and
   providing, for display within the graphical user interface, the enhanced digital image in response to identifying a user input indicating a selection of the selectable image filter.

12. The computer-implemented method of claim 11, wherein generating the document text mask comprises using a histogram-stretched gradient image and an integral image based on the digital image to identify pixels in the histogram-stretched gradient image as foreground pixels or background pixels.

13. The computer-implemented method of claim 11, wherein generating the modified document shadow map comprises removing text reflections in the document shadow map based on the document text mask.

14. The computer-implemented method of claim 11, further comprising generating a shadow-removed digital image by removing shadows from the digital image based on the modified document shadow map and the document text mask, wherein generating the enhanced digital image of the document comprises utilizing contrast stretching to enhance text in the shadow-removed digital image.

15. A system comprising:
   one or more memory devices comprising:
      a machine-learning model for generating document shadow maps of digital images; and
   one or more processors configured to cause the system to:
   scan a document to generate a digital image of the document;
   generate a document text mask from the digital image utilizing adaptive filtering by:
      comparing a pixel color value of a pixel in a gradient image generated from the digital image and an average pixel color value for a group of pixels in an integral image generated from the digital image; and
      determining the pixel in the gradient image corresponds to either a foreground pixel or a background pixel of the document text mask based on the comparison;
   generate a document shadow map of the digital image utilizing the machine-learning model;
   generate a modified document shadow map by removing text reflections in the document shadow map based on the document text mask;
   generate an enhanced digital image of the document based on the modified document shadow map and the document text mask.

16. The system of claim 15, wherein the one or more processors are configured to cause the system to generate the document text mask by:
- determining, for a dark pixel in a histogram-stretched gradient image, an average pixel color value in the integral image for a group of pixels that maps to a corresponding group of pixels neighboring the dark pixel in the histogram-stretched gradient image;
- comparing a pixel color value of the dark pixel in the histogram-stretched gradient image and the average pixel color value for the group of pixels in the integral image; and
- determining the dark pixel in the histogram-stretched gradient image corresponds to either a foreground pixel or a background pixel of the document text mask based on the comparison.

17. The system of claim 15, wherein the one or more processors are configured to cause the system to generate a modified document shadow map by:
- identifying a black pixel in the document text mask;
- identifying a mapped pixel and a group of neighboring pixels in the document shadow map that correspond to the black pixel in the document text mask;
- determining an average shadow intensity value for the group of neighboring pixels in the document shadow map; and
- replacing a shadow intensity value of the mapped pixel in the document shadow map with the average shadow intensity value for the group of neighboring pixels in the document shadow map.

18. The system of claim 17, wherein the one or more processors are configured to cause the system to generate a shadow-removed digital image by:
- determining a reflectance of the digital image using the modified document shadow map;
- generating a binarized shadow map by binarizing the modified document shadow map;
- determining a global background color based on the digital image, the document text mask, and the binarized shadow map; and
- removing shadows from the digital image based on combining the reflectance of the digital image and the global background color.

19. The system of claim 18, wherein the one or more processors are configured to cause the system to generate the enhanced digital image by:
- utilizing black pixels of the document text mask to identify corresponding pixels in the shadow-removed digital image comprising text; and
- utilizing non-linear contrast stretching to darken the text in the shadow-removed digital image.

20. The system of claim 15, wherein the one or more processors are configured to cause the system to:
- determine, based on a ground truth document shadow map, a distance loss for a false positive pixel misclassified as a foreground pixel in a training document shadow map;
- determine, based on the ground truth document shadow map, a group loss for a false negative pixel misclassified as a background pixel in the training document shadow map; and
- generate one or more learned parameters for the machine-learning model based on the distance loss and the group loss.

* * * * *